United States Patent
Wang et al.

(10) Patent No.: US 11,635,623 B2
(45) Date of Patent: Apr. 25, 2023

(54) FOVEATION AND SPATIAL HASHING IN LAYER-BASED COMPUTER-GENERATED HOLOGRAMS

(71) Applicant: NVIDIA Corp., Santa Clara, CA (US)

(72) Inventors: Jui-Hsien Wang, Bellevue, WA (US); Ward Lopes, San Jose, CA (US); Rachel Anastasia Brown, Portland, OR (US); Peter Shirley, Salt Lake City, UT (US)

(73) Assignee: Nvidia Corp., Santa Clara, CA (US)

( * ) Notice: Subject to any disclaimer, the term of this patent is extended or adjusted under 35 U.S.C. 154(b) by 358 days.

(21) Appl. No.: 16/937,235

(22) Filed: Jul. 23, 2020

(65) Prior Publication Data
US 2022/0026715 A1 Jan. 27, 2022

(51) Int. Cl.
*G06T 1/20* (2006.01)
*G02B 27/01* (2006.01)
*G06T 15/00* (2011.01)
*H04L 9/06* (2006.01)
*G06F 16/901* (2019.01)

(52) U.S. Cl.
CPC ..... *G02B 27/0172* (2013.01); *G06F 16/9014* (2019.01); *G06T 1/20* (2013.01); *G06T 15/005* (2013.01); *H04L 9/0643* (2013.01); *G02B 2027/0174* (2013.01); *G06T 2207/10028* (2013.01)

(58) Field of Classification Search
CPC ........ G02B 2027/0174; G02B 27/0172; H04L 9/0643; G06F 16/9014; G06T 1/20; G06T 2207/10028
USPC .......................................................... 359/15
See application file for complete search history.

(56) References Cited

U.S. PATENT DOCUMENTS

| 2009/0097377 | A1* | 4/2009 | Salomon | G11B 7/246 |
| 2015/0243100 | A1* | 8/2015 | Abovitz | G06T 19/006 |
| | | | | 345/633 |
| 2020/0355929 | A1* | 11/2020 | Zhang | G02B 27/0179 |

OTHER PUBLICATIONS

Chang, Chenliang; Cui, Wei; Gao, Liang. "Foveated holographic near-eye 3D display" Optics Express. 2020 ; vol. 28, No. 2. pp. 1345-1356.
Hong, Jisoo et al. "Gaze contingent hologram synthesis for holographic head-mounted display." SPIE OPTO (2016).
Hong, Jisoo. "Foveation in near-eye holographic display." 2018 International Conference on Information and Communication Technology Convergence (ICTC) (2018): 602-604.
J. Hong, Y. Kim, S. Hong, C. Shin, and H. Kang, "Near-eye foveated holographic display," in Imaging and Applied Optics 2018 OSA Technical Digest (Optical Society of America, 2018), paper 3M2G.4.
Lingjie Wei and Yuji Sakamoto, "Fast calculation method with foveated rendering for computer-generated holograms using an angle-changeable ray-tracing method," Appl. Opt. 58, A258-A266 (2019).

(Continued)

*Primary Examiner* — Gordon G Liu
(74) *Attorney, Agent, or Firm* — Rowan TELS LLC

(57) ABSTRACT

The computational scaling challenges of holographic displays are mitigated by techniques for generating holograms that introduce foveation into a wave front recording planes approach to hologram generation. Spatial hashing is applied to organize the points or polygons of a display object into keys and values.

26 Claims, 22 Drawing Sheets

(56) References Cited

OTHER PUBLICATIONS

Yeon-Gyeong Ju and Jae-Hyeung Park, "Foveated computer-generated hologram and its progressive update using triangular mesh scene model for near-eye displays," Opt. Express 27, 23725-23738 (2019).

Chang, Chenliang, et al, Simple calculation of a CGH for lensless holographic 3D projection using a nonuniform sampled wavefront recording plane, Applied Optics, vol. 55, No. 28, Oct. 1, 2016, 7988-7996.

Hasegawa, Naotaka et al., Acceleration of hologram generation by optimizing the arrangement of wavefront recording planes, Applied Optics vol. 56, No. 1, Jan. 1, 2017, A97-A102.

Matsushima, Kyoji et al, Band-limited angular spectrum method for numerical simulation of free-space propagation in far and near fields, Optics Express, vol. 17, No. 22, Oct. 26, 2009.

Phan, Anh-Hoang et al, Generation speed and reconstructed image quality enhancement of a long-depth object using double wavefront recording planes and a gpu, Applied Optics, vol. 53, No. 22, Aug. 1, 2014, 4817-4824.

Phan, Anh-Hoang, et al, Fast hologram generation of long-depth object using multiple wavefront recording planes, Proceedings of SPIE, 2014, San Francisco, California, United States.

Shimobaba, Tomoyoshi, et al, Rapid calculation algorithm of Fresnel computer-generated-hologram using look-up table and wavefront-recording plane methods for three-dimensional display, Optics Express, vol. 19, No. 19, Sep. 13, 2010.

Shimobaba, Tomoyoshi, et al, Simple and fast calculation algorithm for computer-generated hologram with wavefront recording plane, Optics Letters, vol. 24, No. 20, Oct. 15, 2009, 3133-3135.

Symeonidou, Athanasia, et al, CGHs by multiple wavefront recording plane method with occlusion culling, Optics Express, vol. 23, No. 17, Aug. 24, 2015.

Wakunami, Koki et al, Calculation for CGH using ray-sampling plane, Optics Express, vol. 19, No. 10, May 9, 2011.

Wakunami, Koki et al, Occlusion culling for CGH based on ray-wavefront conversion, Optics Express, vol. 21, No. 19, Sep. 23, 2013.

Yan Zhao et al, Accurate calculation of CGH using angular spectrum layer oriented method, Optics Express vol. 23, No. 20, Sep. 21, 2015.

Zhang, Hao, et al. CGH with occlusion effect using layer-based processing, Applied Optics, vol. 56, No. 13, May 1, 2017, F138-F143.

Zhang, Hao, et al., 3D CGH with Fourier domain segmentation, Optics Express vol. 27, No. 8, Apr. 12, 2019.

Chang, Chenliang, et al, v2—Simple calculation of a CGH for lensless holographic 3D projection using a nonuniform sampled wavefront recording plane, Applied Optics, vol. 55, No. 28, Oct. 1, 2016, 7988-7996.

\* cited by examiner

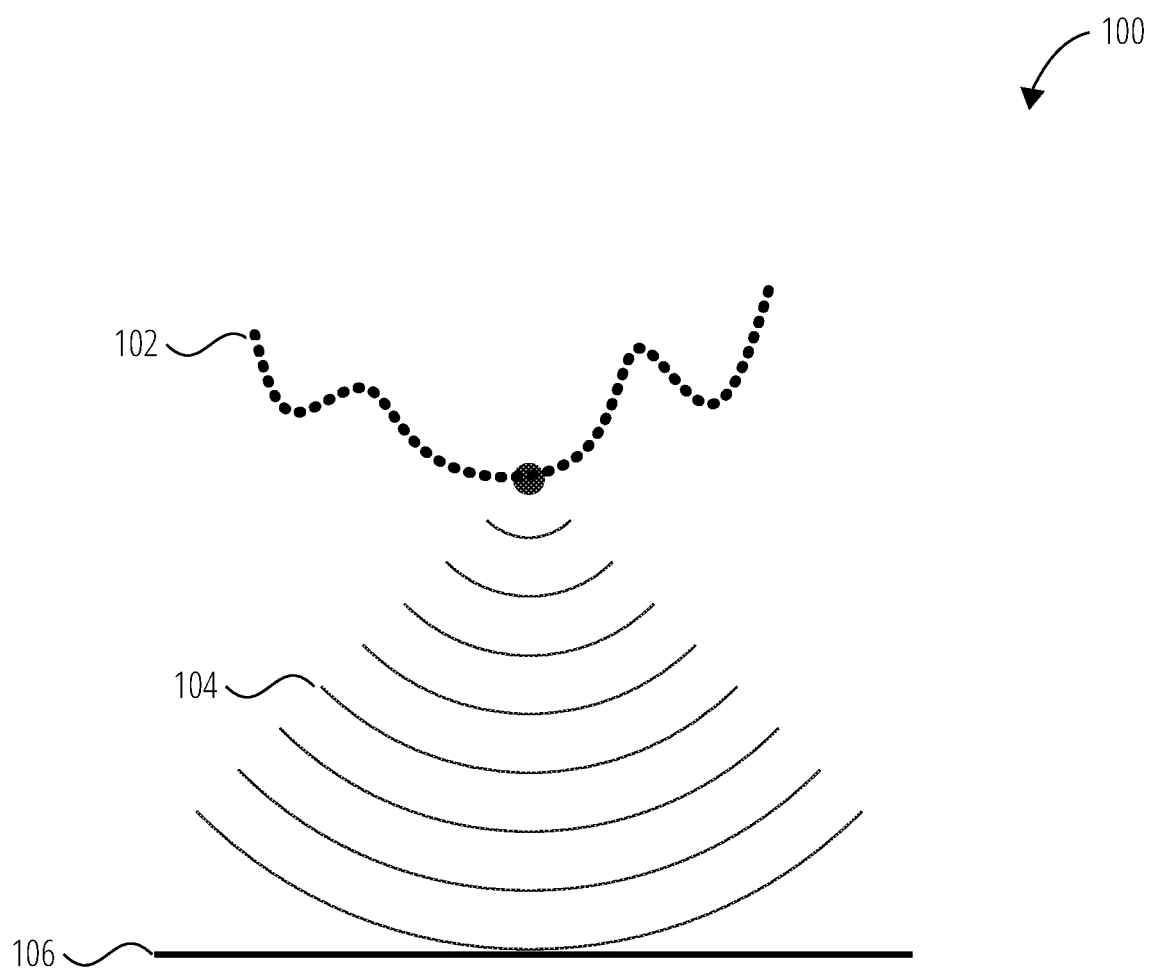

FOVEATION AND SPATIAL HASHING IN LAYER-BASED COMPUTER-GENERATED HOLOGRAMS

BACKGROUND

Holographic displays display three dimensional images without the accommodation-vergence conflict of stereoscopic displays and without the spatial resolution vs. angular resolution trade-off of light field displays. The trade-off for holographic displays is that the calculations to compute the holograms for display on a dynamic holographic display are computationally demanding. For this reason, in practice real time calculations of holograms of three-dimensional images may be performed at lower resolution than for other display types and may be limited to scenes represented by a small number of "image primitives" (e.g., points in a point cloud or number of polygons). Increasing the complexity of the scene and the resolution of the holograms typically results in a large increase in computational complexity. For example, increasing the resolution from 540p to 1080p may increase the calculation complexity by a factor of sixteen, which corresponds to $O(N^4)$ complexity scaling.

BRIEF SUMMARY

This disclosure relates to a method for foveation and spatial hashing in layer-based, computer-generated holograms. A wave front recording plane is first applied to calculate the electric field proximate to a point cloud, polygon mesh, or other representation of a scene to be rendered on a holographic display. Spatial hashing is applied to structure the point cloud or other representation into key value pairs. A key defines an individual position on the wave front recording plane. A value represents a point of the point cloud or polygon of a mesh, for example, that contributes to light at the key position in the wave front recording plane.

This disclosure relates to a further method for foveation and spatial hashing in layer-based, computer-generated holograms. A plurality of wave front recording planes are generated. Spatial hashing is applied to a summation of at least one field from points in a point cloud or other object representation to each of the wave front recording planes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 depicts a wave front recording plane process 100 in accordance with one embodiment.

DETAILED DESCRIPTION

Figure 2A:
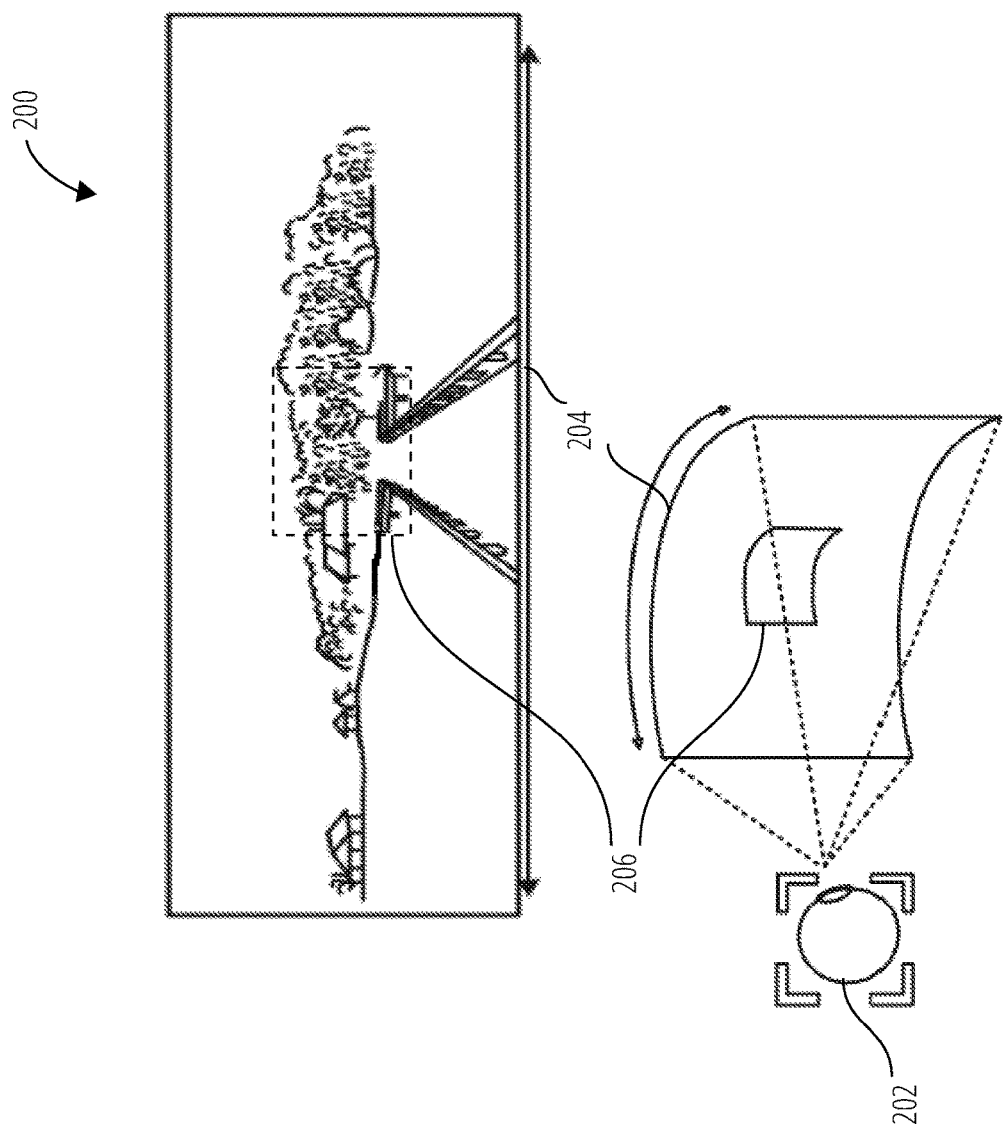
FIG. 2A depicts a field-of-view display 200 in accordance with one embodiment.

The computational scaling challenges of holographic displays may be mitigated by techniques for generating holograms that introduce foveation into a layer-based ("wave front recording planes") approach to hologram generation.

Some models of light projection and reflection (e.g., ray tracing) represent light energy as a beam emanating from a point source, having an indicated intensity (brightness) and wavelength (color). Some models may simplify the beam as a line, without indicating any spread as the beam travels, while others represent the beam as widening as it travels farther from its source. Alternately, visible light reflecting from the elements of a scene may, at any given instant in time, be represented as a waveform. This waveform may be modeled, for example, as a field. Rather than being flat, the waveform might have a complex topography of ripples, peaks, and valleys representing the amplitude and phase of the numerous waves of light impinging on the surface at a single point in time. The ripples, peaks, and valleys may also be continuously changing as time elapses, the way the surface of a cloth might when moved. Such a waveform may be mathematically expressed as a series/sum of weighted sinusoids, which may allow the waveform, i.e., the wave front recording plane, to be broken down into a number of simpler sine or plane wave elements using, for example, a Fourier Transform. These individual sinusoids may then be transformed, propagated, and recombined using an Inverse Fourier Transform.

Henceforth in this disclosure, embodiments are described in the context of objects represented as point clouds. However, the disclosed techniques are generally applicable to objects represented as point clouds and also polygonal objects and the description should also be understood to apply more generally in that regard. A "polygonal object"

refers to a display object that is represented by a collection of polygons (often, triangles) or a mixture of polygons and points.

There are known methods of calculating holograms that utilize wave front recording planes to calculate the electric field (a representation of the light field) close to a point cloud representing the scene to be rendered. This is advantageous because closer to the point cloud the hologram calculations execute faster, and efficient techniques (for example angular spectrum techniques) may be used to propagate the electric field from the wave front recording plane to the hologram. "Angular spectrum technique" refers to a class of algorithms in which a waveform is decomposed into component planewaves (using, for example, a Fourier Transform), each of the component planewaves is propagated to the hologram plane (usually, by adjusting the phase of the plane wave), and then the components are recombined to compute the waveform of the propagated wave (using, for example, an Inverse Fourier Transform).

Conventional algorithms for computing holograms utilizing angular spectrum techniques do not utilize spatial hashing to structure the point cloud. Spatial hashing is a technique whereby objects in a multidimensional space are projected into a lower dimensional hash table to facilitate fast searching and/or fast location detection. For example, objects in a two- or three-dimensional space may be projected onto a one-dimensional hash table. In these conventional approaches, to calculate the contributions of each light source to a particular location in the wave front recording plane, a search is undertaken for the points in the point cloud that contribute to the electric field (or light) at that position in the wave front recording plane.

The disclosed techniques improve upon this process by applying spatial hashing to organize the points in the point cloud into keys and values. The keys are the individual positions on the wave front recording plane and the values are the points in the point cloud that contribute to the light at that position in the wave front recording plane. This may result in an order of magnitude increase in the speed of the calculation as carried out by graphics processing units.

The efficiency of calculation may be further improved by applying foveation to the wave front recording planes. Separate propagation of the foveal region and the peripheral region of the wave front recording planes may provide up to an order of magnitude increase in computational speed. Prior attempts at creating foveated holograms adjust the representation of the 3D model of the scene (e.g., the point cloud sources or the source polygonal mesh) to achieve foveation of the scene, rather than foveation in the wave front recording plane calculation itself.

Layer-based methods of generating holograms using wave front recording planes may be applied for additional calculation efficiencies. Propagating the light from a set of primitive light sources (points or polygons) to a nearby plane is computationally more efficient than propagating the light to a farther away plane. Angular spectrum techniques may be applied to rapidly propagate the light/electric field in these cases.

In the disclosed techniques spatial hashing is applied to the summation of the light (or electric field) from the individual points in a point cloud representing a hologram to the individual wave front recording planes. Conventional wave front recording plane algorithms are of quadratic-complexity and search through the pixels of the scene repeatedly, across all point light sources, to calculate the induced electric field values at the wave front recording planes. Conventional algorithms of this type, when executed on graphics processing units (GPUs), suffer from either inefficient input/output (IO) operations or poor execution parallelization (e.g., random global memory read/write, atomic adds), or utilize an inefficient brute-force point-cloud search. The applications for these algorithms may be limited (e.g., a small number of object points, static scenes); they may be impractical for calculating dynamic holograms in real-time more generally.

The disclosed techniques accelerate field summation on GPUs by utilizing spatial hashing over two passes. In the first pass, a first GPU kernel scans the object points and computes a set of wave front recording plane pixels that correspond to each point, generating an array of key value pairs. In one embodiment the array is hashed into a Cuckoo hash table. A GPU-optimized hashing algorithm may be applied for this purpose. In the second pass, a second, different GPU kernel scans the pixels and determines a set of points for summing the field contributions on the wave front recording planes.

Foveation is applied in each of the wave front recording planes to improve the computational efficiency of propagating the light (electric field) from each of the wave-front recording planes to the hologram. Angular spectrum techniques apply a Fourier Transform of the electric field in the wave front recording plane, alter the phase of each frequency component of the Fourier Transformed electric field based the distance between the wave front recording plane and the hologram, and transform the altered field by applying an Inverse Fourier Transform.

Various techniques may be utilized for foveating the electric/light field from each wave-front recording plane. One technique involves sampling the foveal and the peripheral components of the wave front recording planes separately and combining the results in frequency space either before or after the phases have been adjusted using angular spectrum techniques. Another technique involves sampling the foveal and the peripheral components of the wave front recording planes separately, propagating those fields separately to the hologram, and combining the resulting component holograms to create a foveated hologram. Yet another technique involves sampling the foveal and the peripheral components of the wave front recording planes separately, combining those sampled versions at the position of the wave front recording plane to create a foveated wave front recording plane, and propagating the foveated wave front recording plane to the position of the hologram.

FIG. 1 depicts a wave front recording plane process 100 in one embodiment. A series of wave fronts 104 are propagated from the points of a point cloud object 102 to the pixels of a hologram 106.

Referring to FIG. 2A, a field-of-view display 200 comprises a field-of-view 204, a tracked gaze 202, and a foveal inset display 206.

To reduce the amount of computation and bandwidth utilized to process and render the scene, the tracked gaze 202 may be utilized to determine the position of the foveal inset display 206. The tracked gaze 202 may be determined by pupil position tracking logic (a "pupil tracker"), also referred to herein as gaze tracking. The tracked gaze 202 is utilized to determine the area of the field-of-view 204 to display. The center point of the foveal inset display 206 may be determined by the tracked gaze 202 and the size of the foveal inset display 206 may, in some embodiments, be determined by a pre-set number of degrees from the center point. For example, in one embodiment, the pre-set number of degrees is 30°, resulting in an arc of 60° for the foveal inset display 206. The number of degrees may vary in each axial direction, in some embodiments.

Additionally, the foveal inset display 206 may include different resulting shapes, such as rectangular (as depicted in FIG. 2A), circular, etc. The foveal inset display 206 is generated in the area of the field-of-view 204. The foveal inset display 206 is displayed in a higher resolution than the other portion (i.e., the peripheral image) of the field-of-view 204.

In one embodiment, the peripheral image is displayed with lower (e.g., 5 pixels per degree (ppd)) resolution, while the foveal inset display 206 is displayed with higher (e.g,. 70 ppd) resolution. In another embodiment, a different display mode (e.g., 1080p instead of 780p) may achieve higher resolutions for the foveal inset display 206. The user may not focus on areas of lower resolution (the peripheral image) because they are located in the periphery of the user. The resultant foveated display is then directed toward the user's eye or eyes.

Figure 2B:
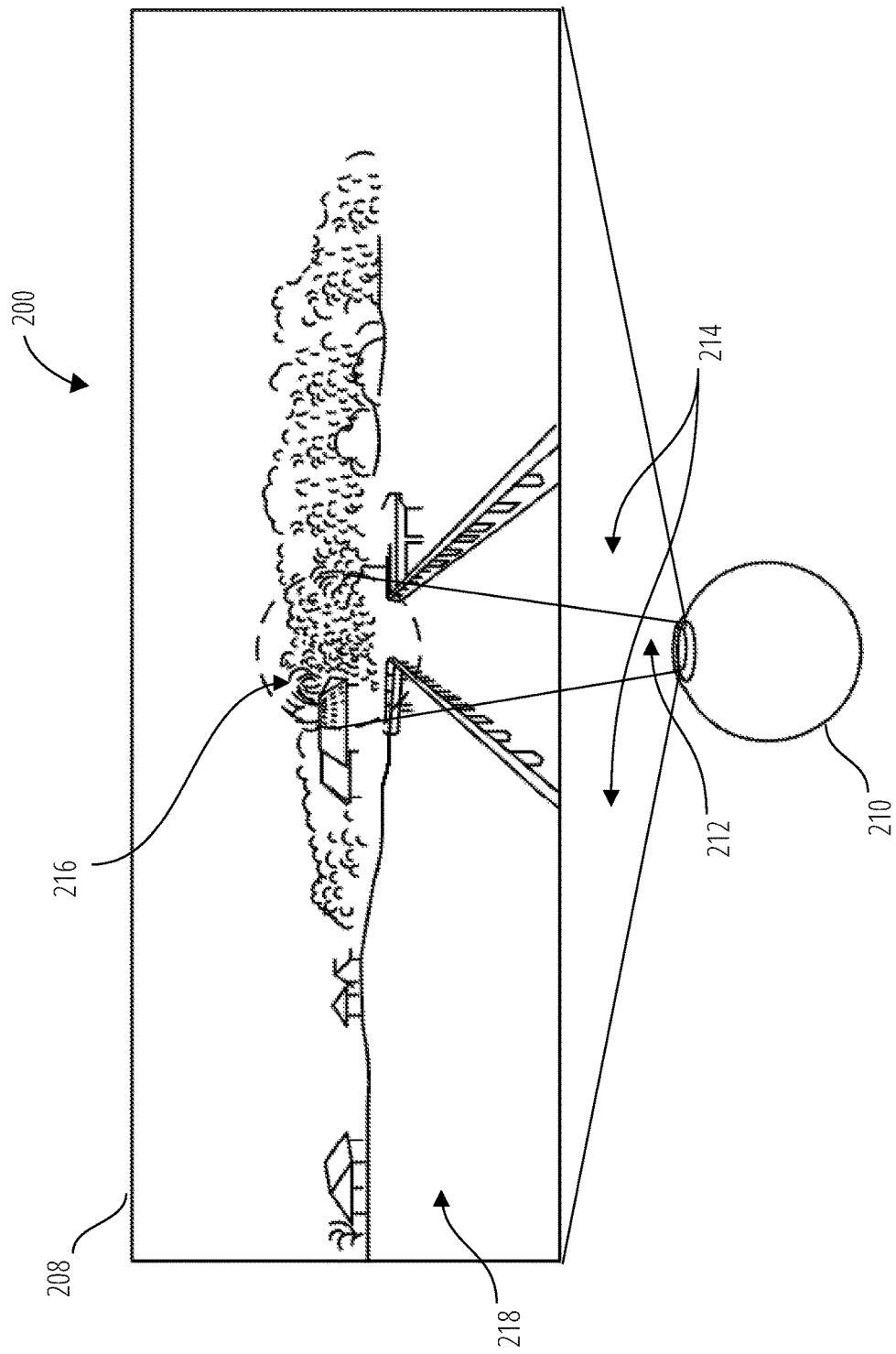
FIG. 2B depicts a field-of-view display 200 in accordance with one embodiment.

Referring to FIG. 2B, a field-of-view display 200 comprises a tracked gaze 210, a fovea region 212, a peripheral region 214, a field-of-view 208, a foveal inset 216, and a peripheral display 218. "Fovea region" refers to the fovea centralis a region of closely packed cones in the eye. It is located in the center of the macula lutea of the retina. Fovea region may also refer to a region of the display that is mapped to a fovea region of the eye, based on a pupil orientation. Whether 'fovea region' refers to a region of the eye or a region of the display will be evident from the context in which the term is used.

The tracked gaze 210 is utilized to determine the location of the fovea region 212. The fovea region 212 may be the center of the tracked gaze 210 and a number of degrees from that center point. For example, the fovea region 212 may be 30° from the center point. The peripheral region 214 may then comprise the portion of the tracked gaze 210 that is not the fovea region 212.

The fovea region 212 and the peripheral region 214 are utilized to determine the portions of the field-of-view 208 of the field-of-view display 200 for the foveal inset 216 and the peripheral display 218, respectively. The portion of the field-of-view 208 corresponding to the fovea region 212, that is, the foveal inset 216, may then be displayed at a higher resolution. The portion of the field-of-view 208 corresponding to the peripheral region 214, that is, the peripheral display 218, may then be displayed at a lower resolution. In another embodiment, a different display mode (e.g., 1080p instead of 780p) may achieve higher resolutions for one or both the foveal inset 216 and the peripheral display 218. Yet further embodiments may utilize other display modes.

Figure 2C:
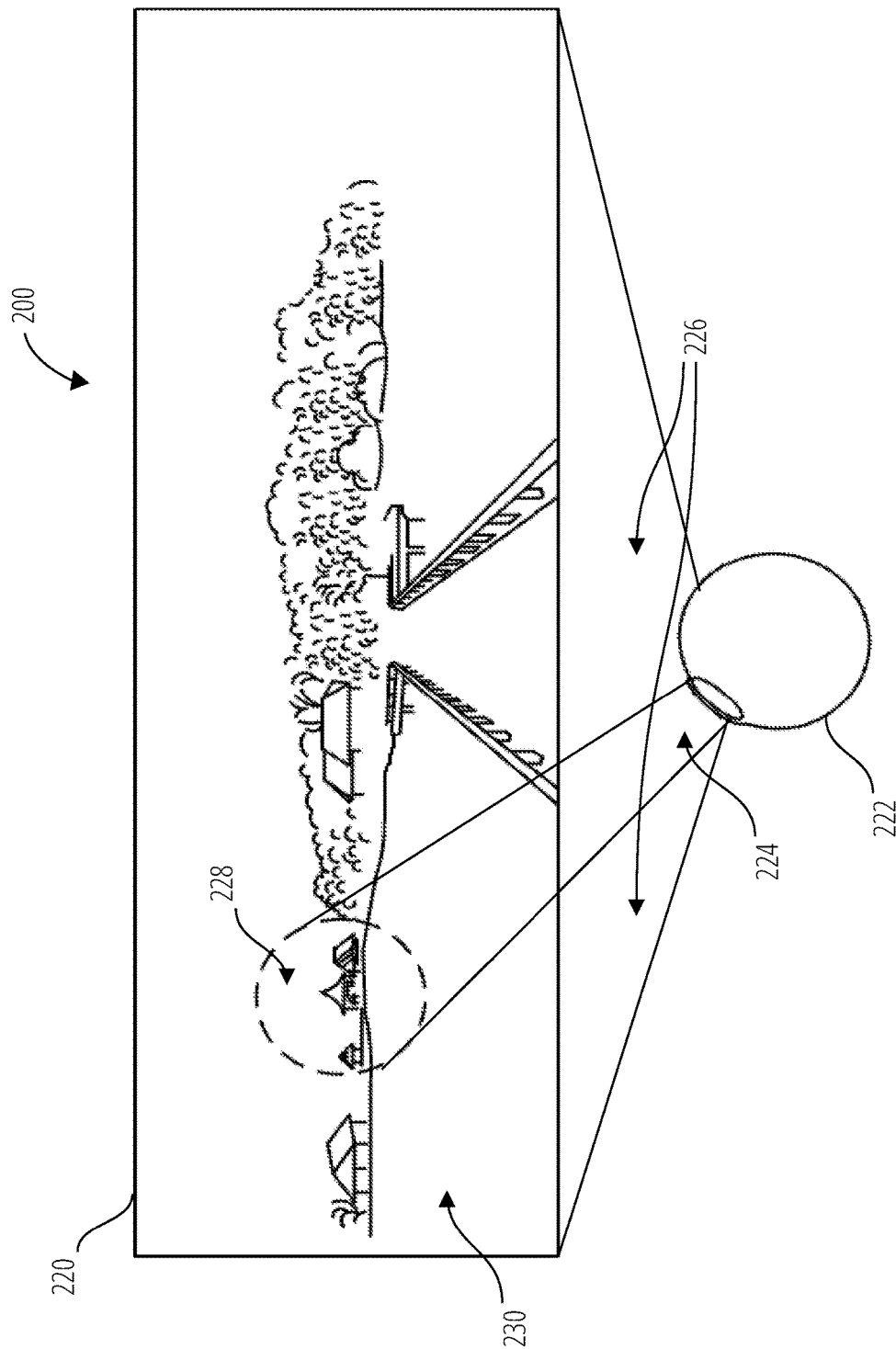
FIG. 2C depicts a field-of-view display 200 in accordance with one embodiment.

Referring to FIG. 2C, a field-of-view display 200 comprises a tracked gaze 222, a fovea region 224, a peripheral region 226, a field-of-view 220, a foveal inset 228, and a peripheral display 230.

The tracked gaze 222 is utilized to determine the fovea region 224 and the peripheral region 226. The fovea region 224 and the peripheral region 226 determine the foveal inset 228 and the peripheral display 230 of the field-of-view 220, respectively. The foveal inset 228 and the peripheral display 230 may then be displayed on the field-of-view display 200 at different resolutions.

Figure 3:
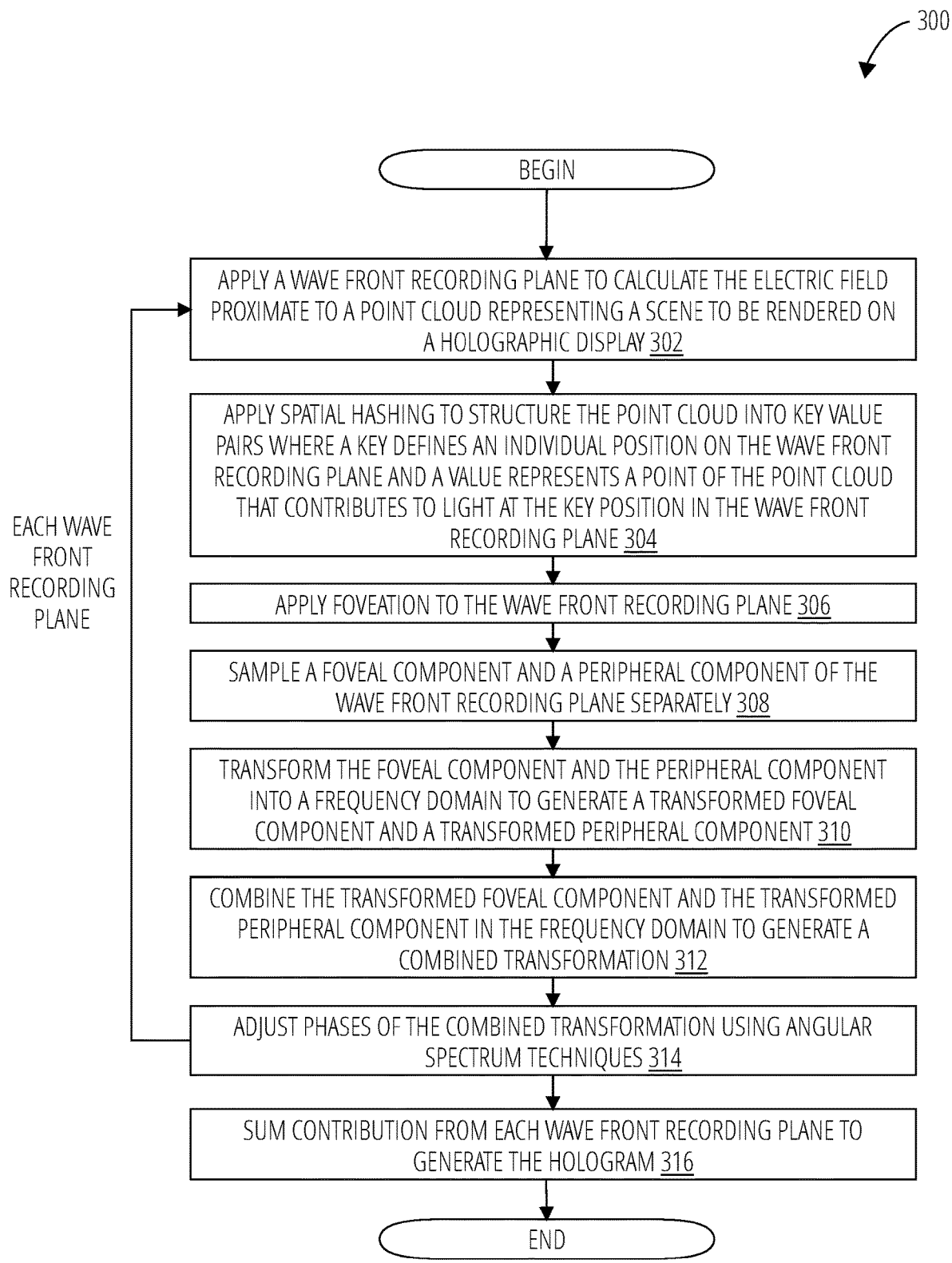
FIG. 3 depicts a routine 300 in accordance with one embodiment.

FIG. 3 depicts a routine 300 utilizing foveation with wave front recording planes and spatial hashing, in one embodiment. At block 302, a wave front recording plane is applied to calculate the electric field proximate to a point cloud representing a scene to be rendered on a holographic display. "Proximate to a point cloud", for example, refers to a distance between the wave front recording plane and the points in the point cloud within a configured closeness value to the wave front recording plane. This proximate distance is set such that all of the points of the point cloud within a configured maximum and minimum distance (z_min and z_max) contribute non-negligibly to the electric field calculated at the position of the wave front recording plane and such that the contribution of any particular point in the range from z-min to z_max does not make the contribution to the electric field due to another point in this distance negligible ('negligible' meaning below a configured threshold value). If all points are in the point cloud are within the range from z_min to z_max, one wave front recording plane may be sufficient for the generation of the hologram.

At block 304, spatial hashing is applied to structure the point cloud into key value pairs where a key defines an individual position on the wave front recording plane and a value represents a point of the point cloud that contributes to light at the key position in the wave front recording plane. At block 306, foveation is applied to the wave front recording plane. At block 308, a foveal component and a peripheral component of the wave front recording plane are sampled separately. At block 310, the foveal component and the peripheral component are transformed into a frequency domain to generate a transformed foveal component and a transformed peripheral component. At block 312, the transformed foveal component and the transformed peripheral component are combined in the frequency domain to generate a combined transformation. At block 314, the phases of the combined transformation are adjusted using angular spectrum techniques. This process may be repeated for each utilized wave front recording plane, and once that is completed, the contributions of each wave front recording plane may be summed to generate the hologram at block 316.

In some embodiments, before summing the contributions from the different wave front recording planes, the results of block 314 may be transformed again using an Inverse Fourier Transform or a second Fourier Transform. This last transformation may also be performed optically (with a lens having Fourier Transform optical properties) in some embodiments.

Figure 4:
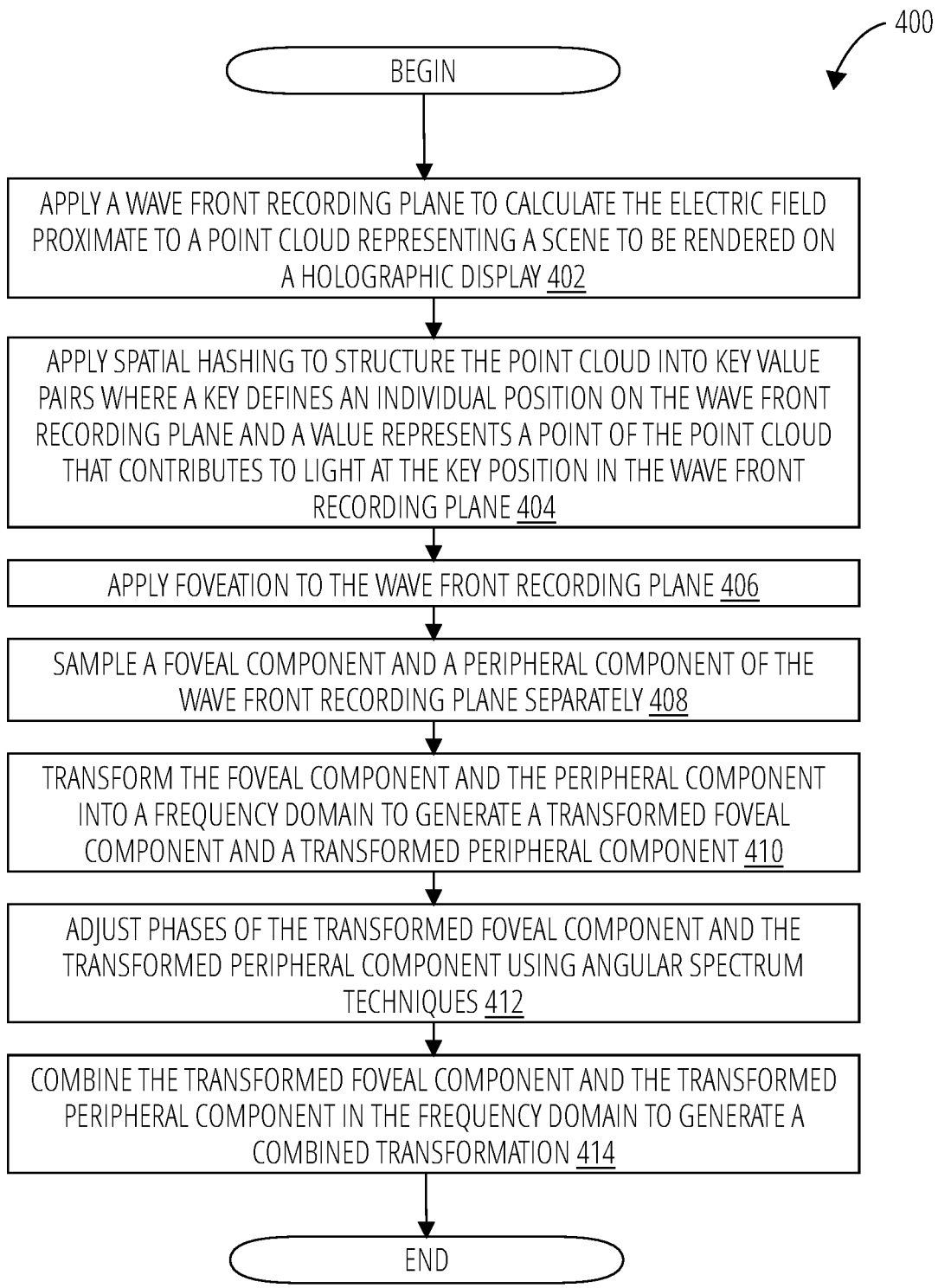
FIG. 4 depicts a routine 400 in accordance with one embodiment.

Various operations of the routine 300 may be performed on a server device with results communicated to a client device over a network. (e.g., see FIG. 9). For example, block 302-block 316 may be performed on a server system and the resulting hologram may be communicated to a client device for display/rendering FIG. 4 depicts a routine 400 utilizing foveation with wave front recording planes and spatial hashing, in another embodiment. At block 402, a wave front recording plane is applied to calculate the electrical field proximate to a point cloud representing a scene to be rendered on a holographic display. At block 404, spatial hashing is applied to structure the point cloud into key value pairs where a key defines an individual position on the wave front recording plane and a value represents a point of the point cloud that contributes to light at the key position in the wave front recording plane. At block 406, foveation is applied to the wave front recording plane. At block 408, a foveal component and a peripheral component of the wave front recording plane are sampled separately. At block 410, the foveal component and the peripheral component are transformed into a frequency domain to generate a transformed foveal component and a transformed peripheral component. At block 412, the phases of the transformed foveal component and the transformed peripheral component are adjusted using angular spectrum techniques. At block 414, the transformed foveal component and the transformed peripheral component are combined in the frequency domain to generate a combined transformation.

Like in the routine 300 depicted in FIG. 3, this process may be repeated for each utilized wave front recording plane, and once that is completed, the contributions of each wave front recording plane (possibly after another transformation) maybe summed to generate the hologram.

Various operations of the routine 400 may be performed on a server device with results communicated to a client device over a network. (e.g., see FIG. 9). For example, block 402-block 412 may be performed on a server system and the results communicated to a client device for display/rendering.

Figure 5:
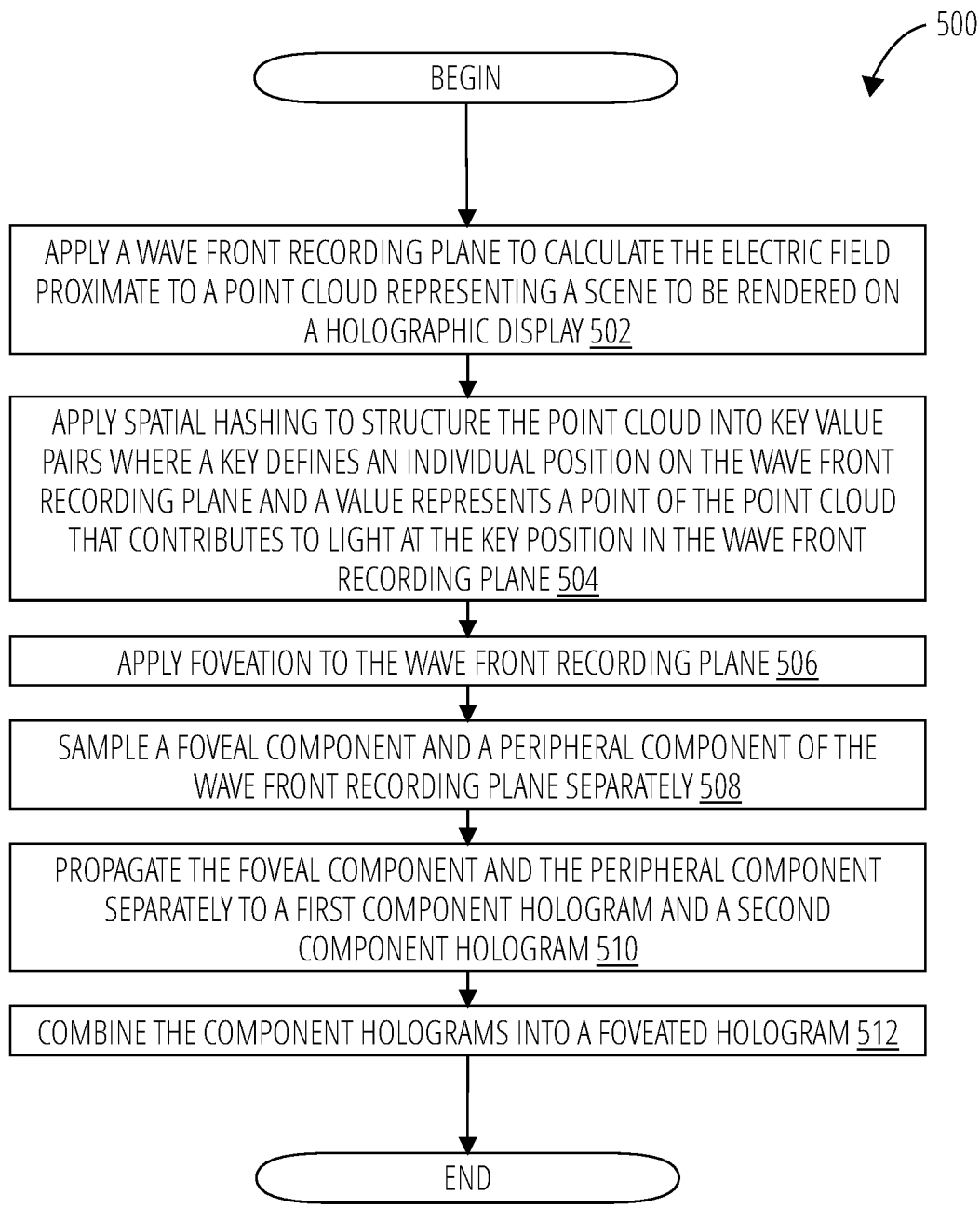
FIG. 5 depicts a routine 500 in accordance with one embodiment.

FIG. 5 depicts a routine 500 utilizing foveation with wave front recording planes and spatial hashing, in yet another embodiment. At block 502, a wave front recording plane is applied to calculate the electrical field proximate to a point cloud representing a scene to be rendered on a holographic display. At block 504, spatial hashing is applied to structure the point cloud into key value pairs where a key defines an individual position on the wave front recording plane and a value represents a point of the point cloud that contributes to light at the key position in the wave front recording plane. At block 506, foveation is applied to the wave front recording plane. At block 508, a foveal component and a peripheral component of the wave front recording plane are sampled separately. At block 510, the foveal component and the peripheral component are propagated separately to a first component hologram and a second component hologram. At block 512, the component holograms are combined into a foveated hologram.

Various operations of the routine 500 may be performed on a server device with results communicated to a client device over a network. (e.g., see FIG. 9). For example, the foveal component and peripheral components may be computed on a server device and the component holograms generated on the server device, with the resulting completed hologram communicated to a client device for display. In another embodiment the foveal component and peripheral components may be computed on a server device and communicated to a client device for display, which generates and renders/displays the completed hologram.

Figure 6:
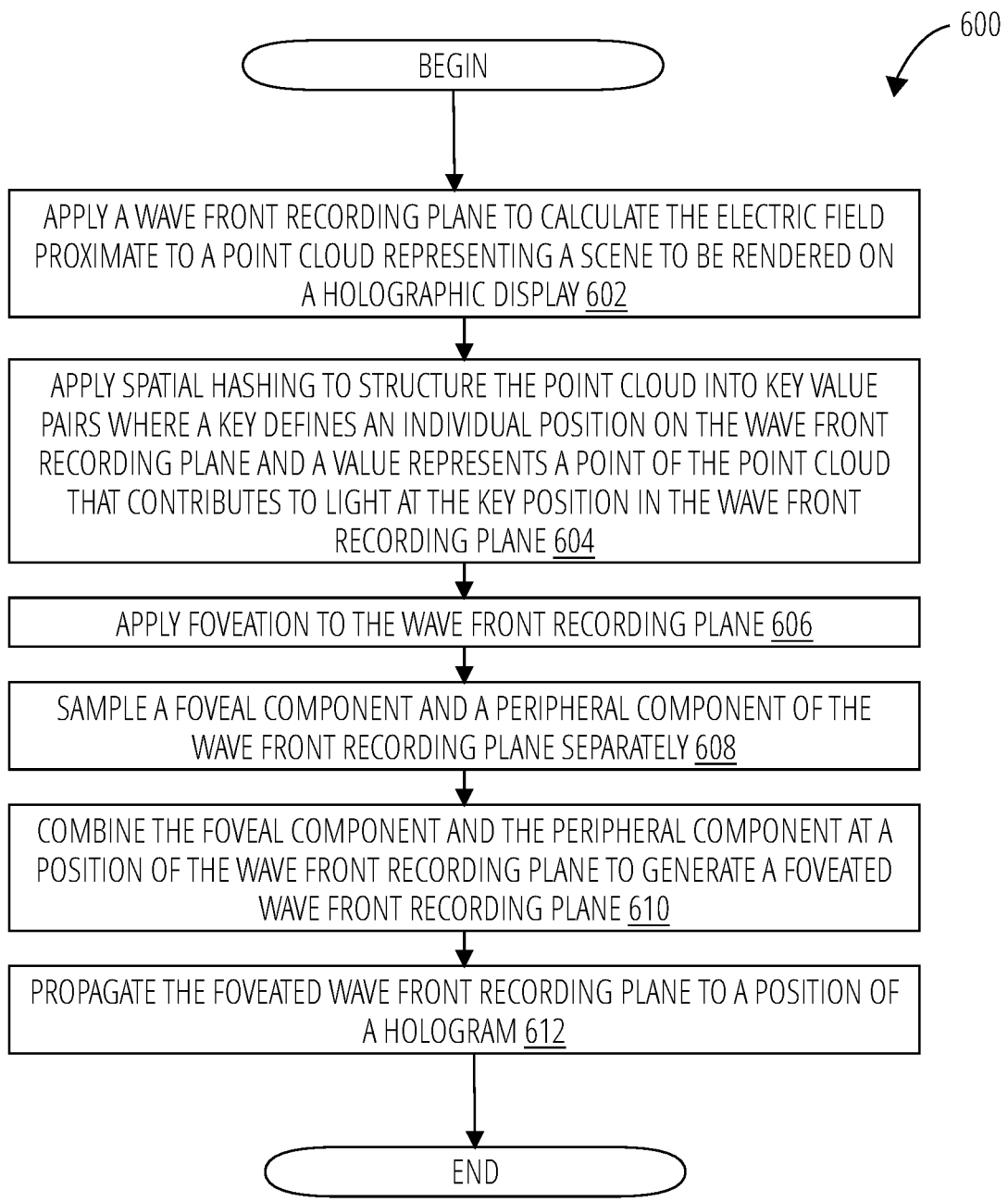
FIG. 6 depicts a routine 600 in accordance with one embodiment.

FIG. 6 depicts a routine 600 utilizing foveation with wave front recording planes and spatial hashing, in another embodiment. At block 602, a wave front recording plane is applied to calculate the electrical field proximate to a point cloud representing a scene to be rendered on a holographic display. At block 604, spatial hashing is applied to structure the point cloud into key value pairs where a key defines an individual position on the wave front recording plane and a value represents a point of the point cloud that contributes to light at the key position in the wave front recording plane. At block 606, foveation is applied to the wave front recording plane. At block 608, a foveal component and a peripheral component of the wave front recording plane are sampled separately. At block 610, the foveal component and the peripheral component are combined at a position of the wave front recording plane to generate a foveated wave front recording plane. At block 612, the foveated wave front recording plane is propagated to a position of a hologram.

Various operations of the routine 600 may be performed on a server device with results communicated to a client device over a network. (e.g., see FIG. 9). For example, block 602-block 612 may be carried out on a server device, with the results communicated to a client device to perform block 612 and display the completed hologram. In another embodiment block 602-block 608 may be carried out on a server device, with the results communicated to a client device to perform block 610 and block 612 and render/display the completed hologram.

Figure 7:
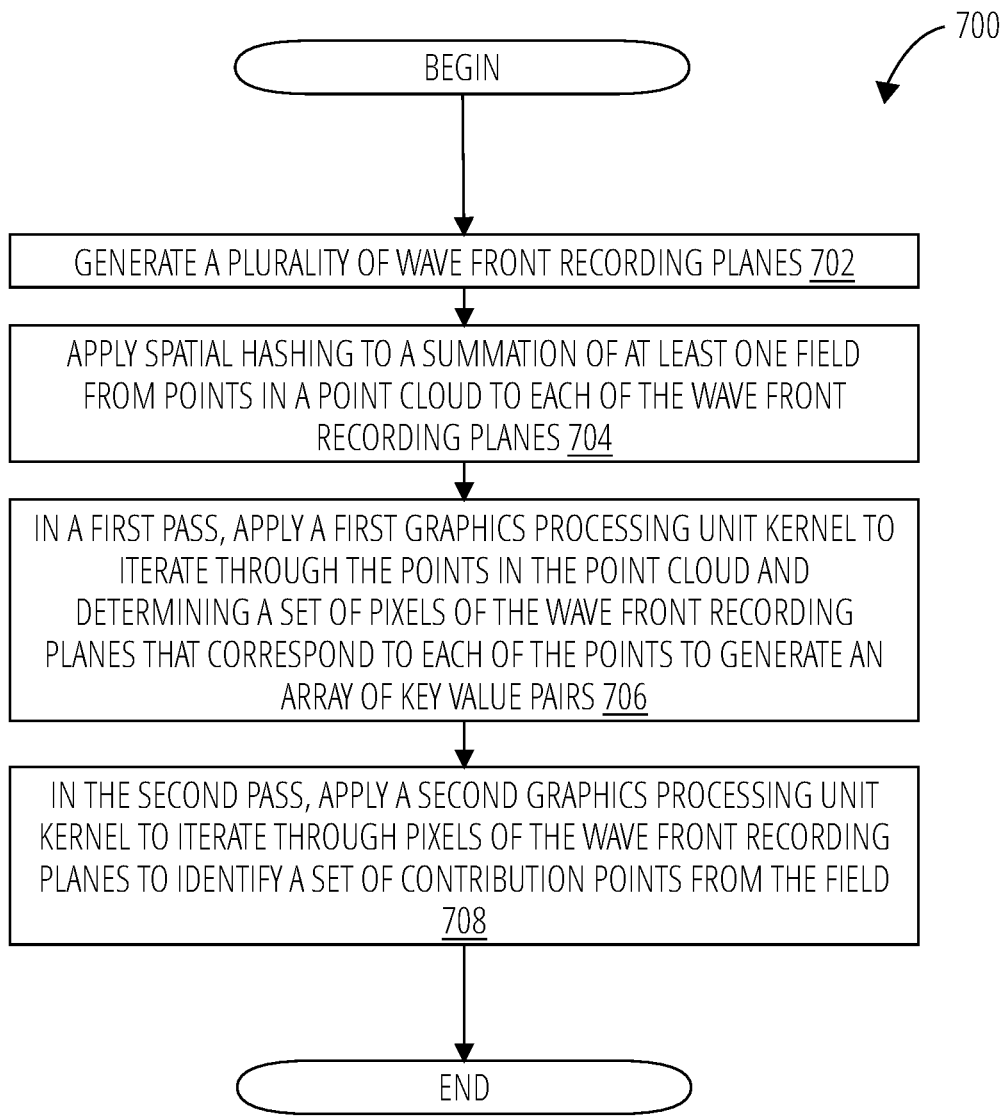
FIG. 7 depicts a routine 700 in accordance with one embodiment.

FIG. 7 depicts a routine 700 utilizing wave front recording planes and spatial hashing, in one embodiment. At block 702, a plurality of wave front recording planes are generated. At block 704, spatial hashing is applied to a summation of at least one field from points in a point cloud to each of the wave front recording planes. At block 706, a first graphics processing unit kernel is applied in a first pass to iterate through the points in the point cloud and determine a set of pixels of the wave front recording planes that correspond to each of the points to generate an array of key value pairs. At block 708, a second graphics processing unit kernel is applied in a second pass to iterate through pixels of the wave front recording planes to identify a set of contribution points from the field.

Various operations of the routine 700 may be performed on a server device with results communicated to a client device over a network. (e.g., see FIG. 9). For example, block 702-block 708 may be carried out on a server device, with the results communicated to a client device to perform final generation and render/display of the completed hologram.

Figure 8A:
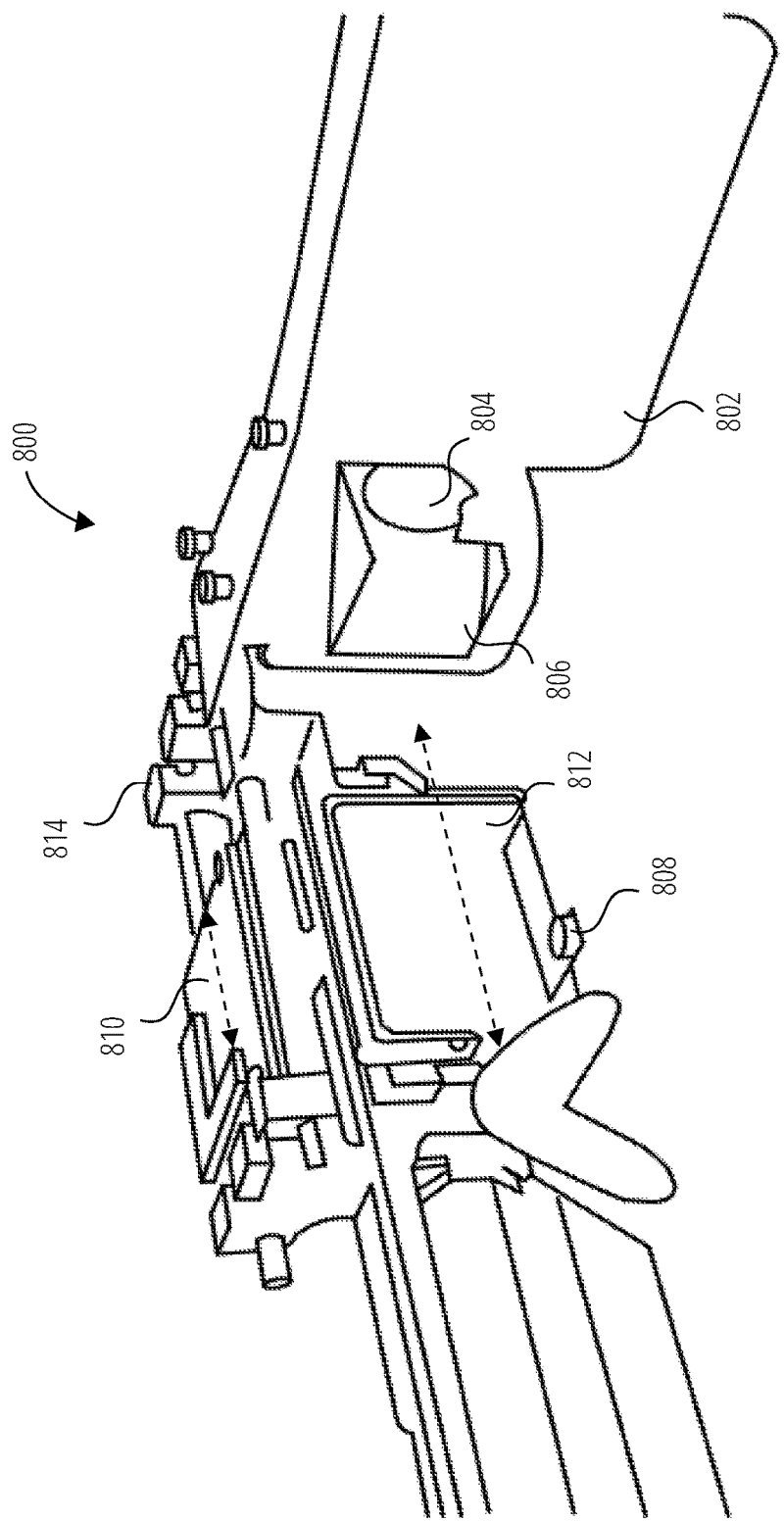
FIG. 8A depicts an augmented reality foveated display headset 800 in accordance with one embodiment.
Figure 8B:
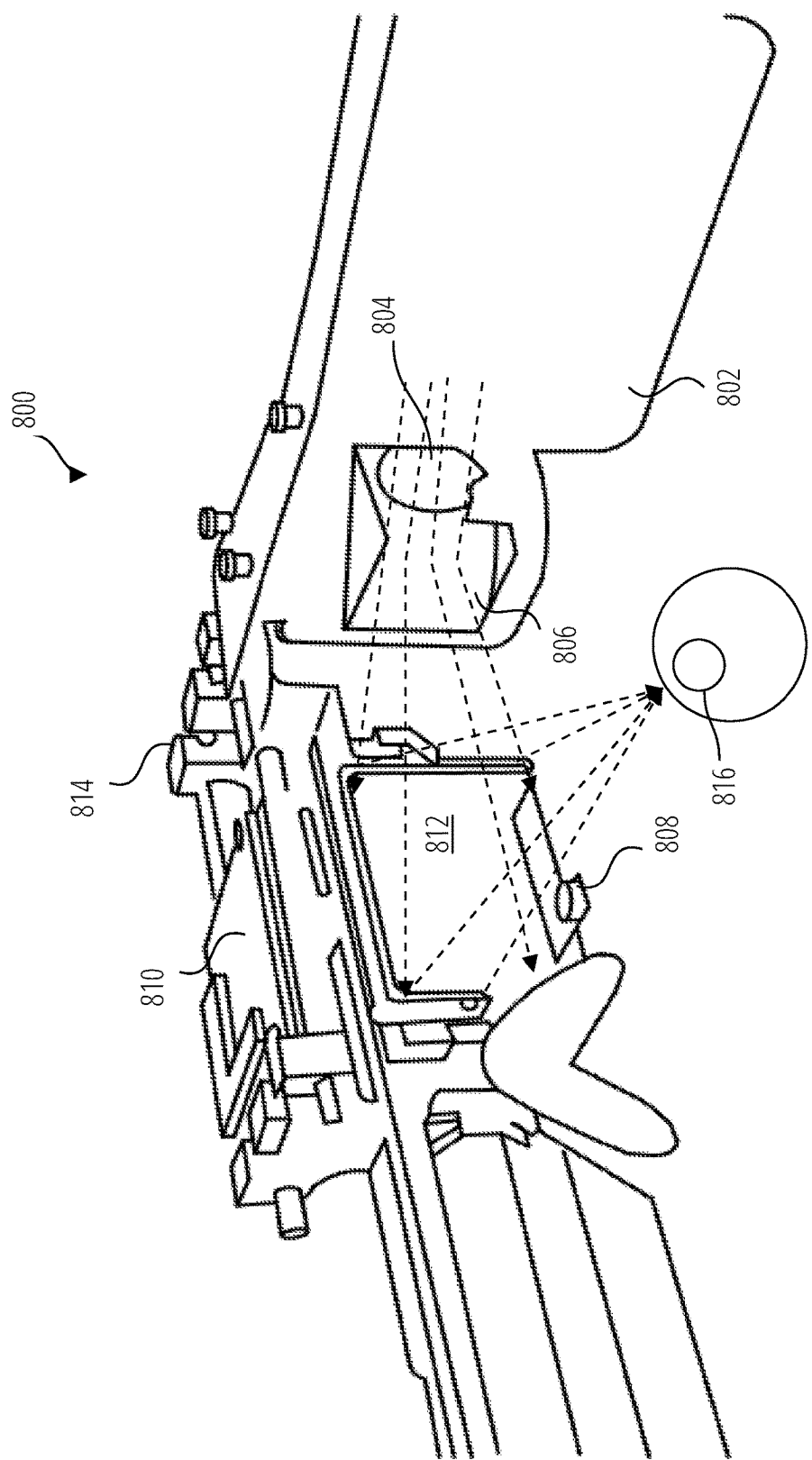
FIG. 8B depicts the augmented reality foveated display headset 800 in another aspect.
Figure 8C:
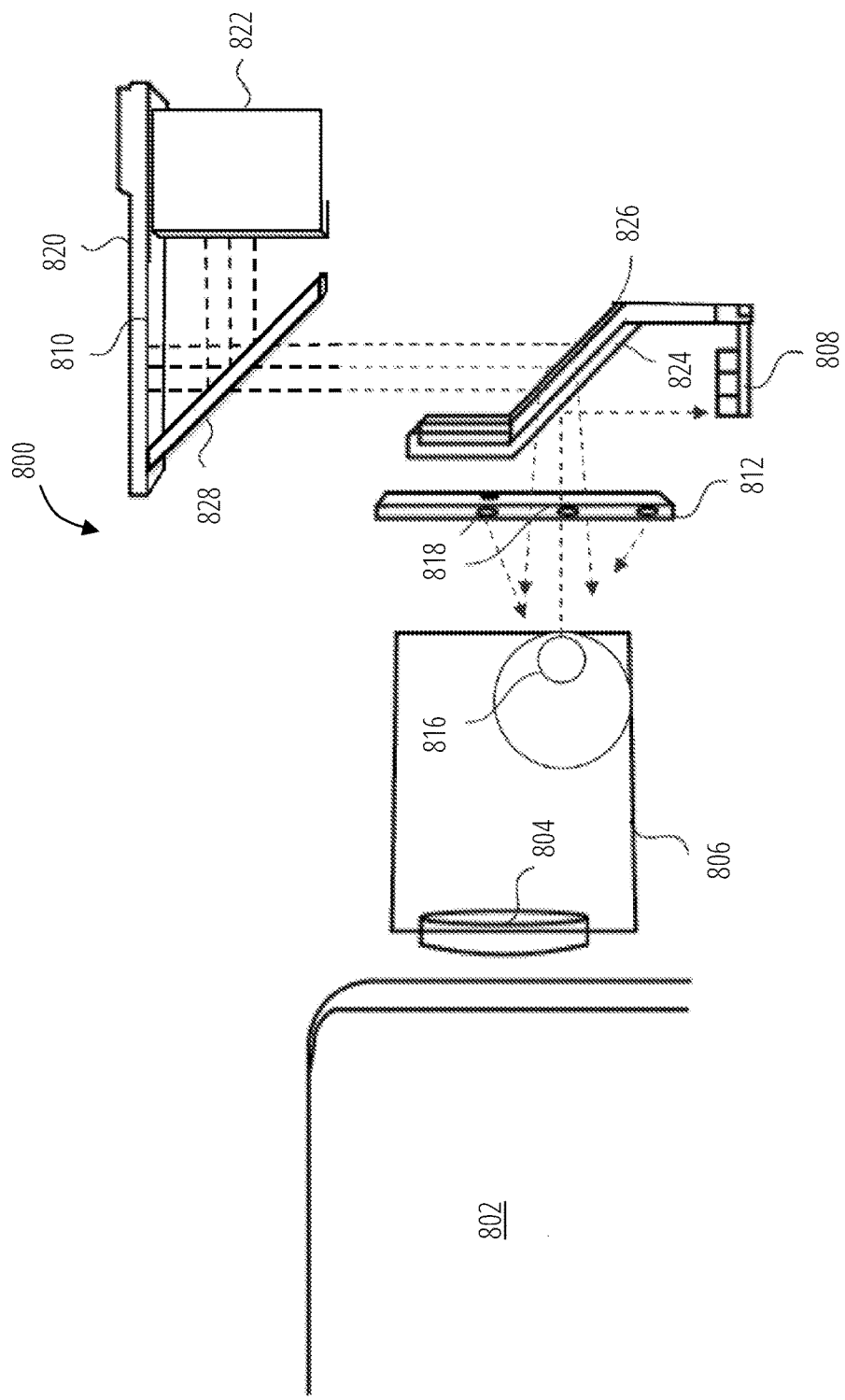
FIG. 8C further depicts the augmented reality foveated display headset 800 in another aspect.

FIG. 8A depicts an augmented reality foveated display headset 800 that may be utilized with these techniques, in one embodiment. The augmented reality foveated display headset 800 comprises a projector 802, a convex lens 804, a prism 806, an eye tracking camera 808, a holographic optical element 812, a holographic display unit 810, and a moveable stage 814. The holographic display unit 810 may include a holographic optical element. "Holographic optical element" refers to an optical element (such as a lens, filter, beam splitter, or diffraction grating) that is produced using holographic imaging processes for example from dichromated gelatin and photoresists.

Depending on the embodiment, the moveable stage 814 enables positioning of the holographic optical element 812 and holographic display unit 810 horizontally, vertically, and/or depth wise. The ability to position the holographic optical element 812 and holographic display unit 810 (and thus the position of the foveal inset) based on pupil tracking may result in a larger eye box than is possible in conventional headset devices, for example 10x or greater improvement in eye box area. "Eye box" refers to an area in which the eye can be positioned forward, backward, and side to side while remaining focused on a target.

The projector 802 is used to generate scene features not presented by the holographic display unit 810 by generating light rays that are directed by the prism 806 (or a mirror) to the holographic optical element 812, which reflects the rays to the pupil position 816. The holographic display unit 810 includes a spatial light modulator 820 that displays the hologram, light source 822 that illuminates the spatial light modulator 820, and a half mirror 828. A "spatial light modulator" is an element that imposes some form of spatially varying modulation on incident light. A spatial light modulator may alter the amplitude of the light, the phase of the light, or both. "Half mirror" refers to a mirror that is only partially reflective. For example, a half mirror may reflect half of the incident light and transmit the other half of the incident light through the mirror. In the holographic display unit, light emitted by the light source is directed by the half mirror towards the spatial light modulator. The light is modulated by the hologram displayed on the spatial light modulator 820 and then directed towards the holographic optical element 812. The augmented reality image is generated from the holographic display unit 810 which directs light rays to a holographic optical element 824 which acts as a mirror and lens, which in turn reflects the rays through the lens holographic optical element 812 to the pupil position 816.

For gaze tracking, infrared light-emitting diodes 818 positioned on the holographic optical element 812 direct infrared light to the pupil position 816 of the user's eye. The infrared rays are reflected off the user's eye, through the holographic optical element 812 and holographic optical element 824, reflected off a hot mirror 826, and directed to an eye tracking camera 808. A hot mirror is a mirror which reflects infrared light but transmits visible light. The eye tracking camera 808 inputs the reflected light information to logic that determines a position for the holographic display unit 810 and/or holographic optical element 824 and operates the moveable stage 814 to position the holographic display unit 810 and/or holographic optical element 824 to improve positioning of the foveal inset on composite augmented reality images perceived by the user.

Example Game Streaming System

Figure 9:
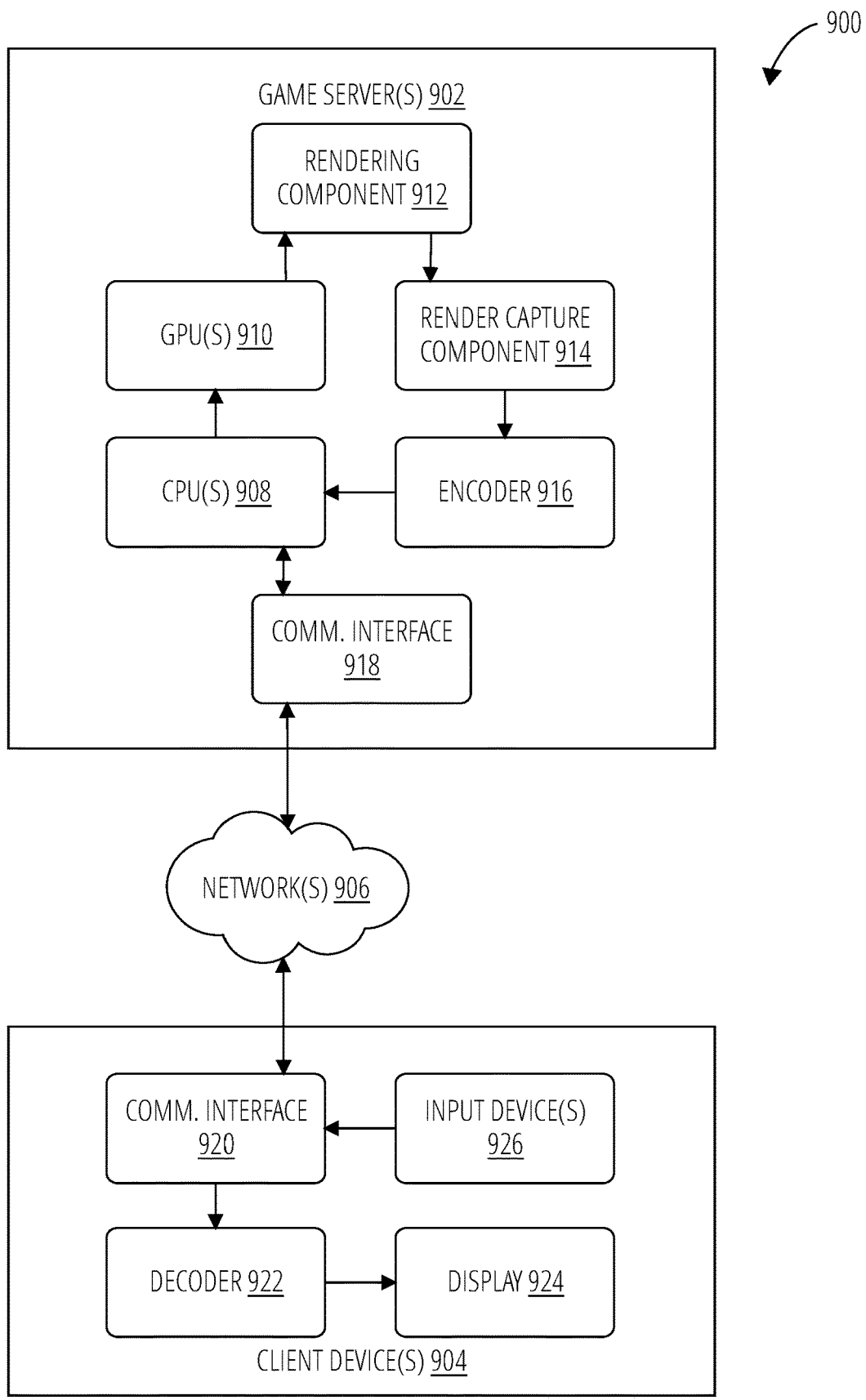
FIG. 9 is a block diagram of an example game streaming system 900 suitable for use in implementing some embodiments of the present disclosure.

Now referring to FIG. 9, FIG. 9 is an example system diagram for a game streaming system 900, in accordance with some embodiments of the present disclosure. FIG. 9 includes game server(s) 902(which may include similar components, features, and/or functionality to the example computing system 1700, client device(s) 904 (which may include similar components, features, and/or functionality to the example computing system 1700 of FIG. 17A and/or FIG. 17B, and network(s) 906 (which may be similar to the network(s) described herein). In some embodiments of the present disclosure, the game streaming system 900 may be implemented.

In the game streaming system 900, for a game session, the client device(s) 904 may only receive input data in response to inputs to the input device(s), transmit the input data to the game server(s) 902, receive encoded display data from the game server(s) 902, and display the display data on the display 924. As such, the more computationally intense computing and processing is offloaded to the game server(s) 902 (e.g., rendering—in particular ray or path tracing—for graphical output of the game session is executed by the GPU(s) of the game server(s) 902). In other words, the game session is streamed to the client device(s) 904 from the game server(s) 902, thereby reducing the requirements of the client device(s) 904 for graphics processing and rendering.

For example, with respect to an instantiation of a game session, a client device 904 may be displaying a frame of the game session on the display 924 based on receiving the display data from the game server(s) 902. The client device 904 may receive an input to one of the input device(s) and generate input data in response. The client device 904 may transmit the input data to the game server(s) 902 via the communication interface 920 and over the network(s) 906 (e.g., the Internet), and the game server(s) 902 may receive the input data via the communication interface 918. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 912 may render the game session (e.g., representative of the result of the input data) and the render capture component 914 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 902. The encoder 916 may then encode the display data to generate encoded display data and the encoded display data may be transmitted to the client device 904 over the network(s) 906 via the communication interface 918. The client device 904 may receive the encoded display data via the communication interface 920 and the decoder 922 may decode the encoded display data to generate the display data. The client device 904 may then display the display data via the display 924.

The algorithms and techniques disclosed herein may be executed by computing devices utilizing one or more graphic processing unit (GPU) and/or general purpose data processor (e.g., a 'central processing unit or CPU). For example, all or aspects of the routine 300, routine 400, routine 500, routine 600 and/or routine 700 may be implemented on such devices. Exemplary architectures will now be described that may be configured to carry out the techniques disclosed herein on such devices.

The following description may use certain acronyms and abbreviations as follows:
"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 10:
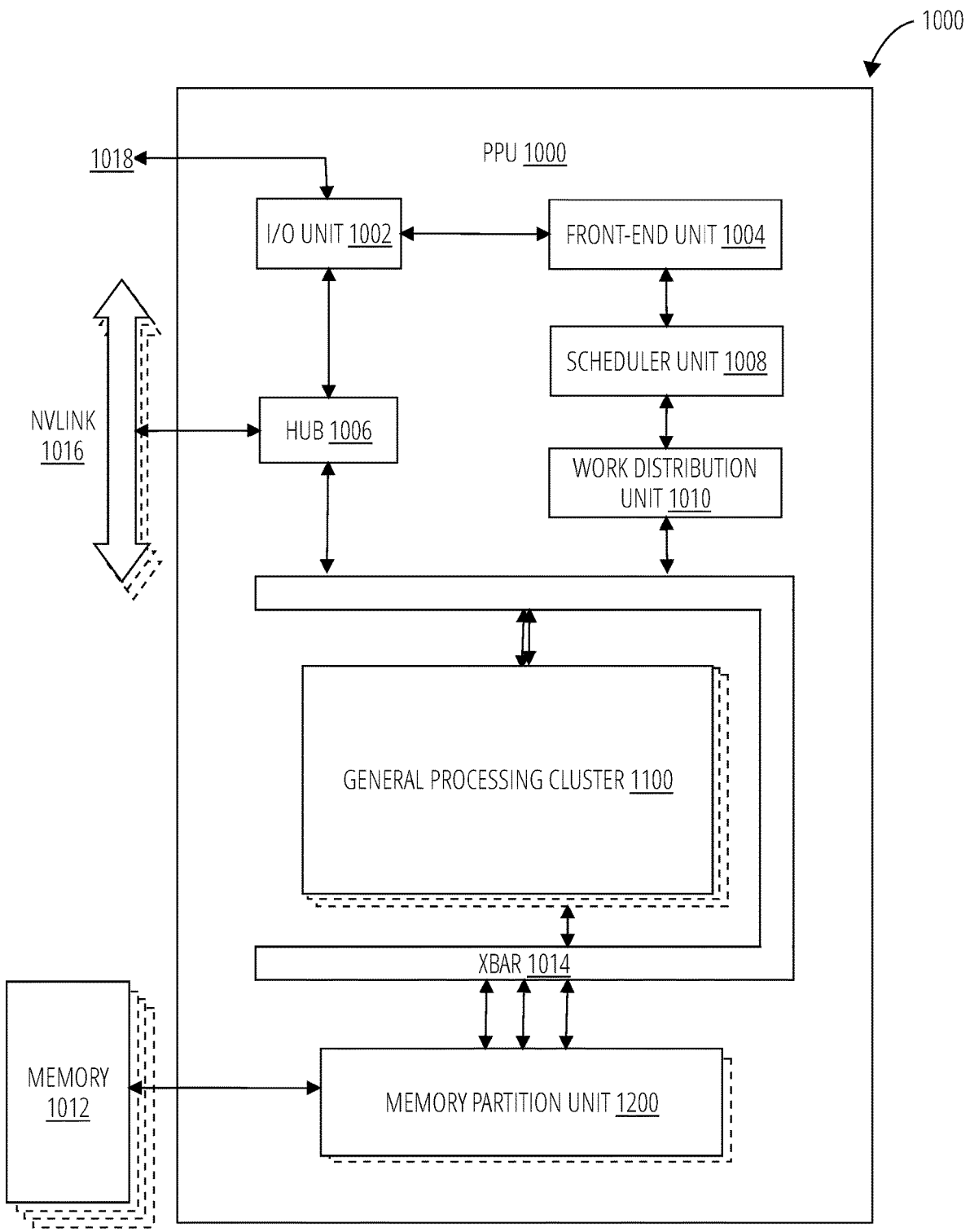
FIG. 10 depicts a parallel processing unit 1000 in accordance with one embodiment.

FIG. 10 depicts a parallel processing unit 1000, in accordance with an embodiment. In an embodiment, the parallel processing unit 1000 is a multi-threaded processor that is implemented on one or more integrated circuit devices. The parallel processing unit 1000 is a latency hiding architecture designed to process many threads in parallel. A thread (e.g., a thread of execution) is an instantiation of a set of instructions configured to be executed by the parallel processing unit 1000. In an embodiment, the parallel processing unit 1000 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1000 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1000 modules may be configured to accelerate thousands of High Performance Computing (HPC), data center, and machine learning applications. The parallel processing unit 1000 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 10, the parallel processing unit 1000 includes an I/O unit 1002, a front-end unit 1004, a scheduler unit 1008, a work distribution unit 1010, a hub 1006, a crossbar 1014, one or more general processing cluster 1100 modules, and one or more memory partition unit 1200 modules. The parallel processing unit 1000 may be connected to a host processor or other parallel processing unit 1000 modules via one or more high-speed NVLink 1016 interconnects. The parallel processing unit 1000 may be connected to a host processor or other peripheral devices via an interconnect 1018. The parallel processing unit 1000 may also be connected to a local memory comprising a number of memory 1012 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1012 may comprise logic to configure the parallel processing unit 1000 to carry out aspects of the techniques disclosed herein.

The NVLink 1016 interconnect enables systems to scale and include one or more parallel processing unit 1000 modules combined with one or more CPUs, supports cache coherence between the parallel processing unit 1000 modules and CPUs, and CPU mastering. Data and/or commands may be transmitted by the NVLink 1016 through the hub 1006 to/from other units of the parallel processing unit 1000 such as one or more copy engines, a video encoder, a video decoder, a power management unit, etc. (not explicitly shown). The NVLink 1016 is described in more detail in conjunction with FIG. 14.

The I/O unit 1002 is configured to transmit and receive communications (e.g., commands, data, etc.) from a host processor (not shown) over the interconnect 1018. The I/O unit 1002 may communicate with the host processor directly via the interconnect 1018 or through one or more intermediate devices such as a memory bridge. In an embodiment, the I/O unit 1002 may communicate with one or more other processors, such as one or more parallel processing unit 1000 modules via the interconnect 1018. In an embodiment, the I/O unit 1002 implements a Peripheral Component Interconnect Express (PCIe) interface for communications over a PCIe bus and the interconnect 1018 is a PCIe bus. In alternative embodiments, the I/O unit 1002 may implement other types of well-known interfaces for communicating with external devices.

The I/O unit 1002 decodes packets received via the interconnect 1018. In an embodiment, the packets represent commands configured to cause the parallel processing unit 1000 to perform various operations. The I/O unit 1002 transmits the decoded commands to various other units of the parallel processing unit 1000 as the commands may specify. For example, some commands may be transmitted to the front-end unit 1004. Other commands may be transmitted to the hub 1006 or other units of the parallel processing unit 1000 such as one or more copy engines, a video encoder, a video decoder, a power management unit, etc. (not explicitly shown). In other words, the I/O unit 1002 is configured to route communications between and among the various logical units of the parallel processing unit 1000.

In an embodiment, a program executed by the host processor encodes a command stream in a buffer that provides workloads to the parallel processing unit 1000 for processing. A workload may comprise several instructions and data to be processed by those instructions. The buffer is a region in a memory that is accessible (e.g., read/write) by both the host processor and the parallel processing unit 1000. For example, the I/O unit 1002 may be configured to access the buffer in a system memory connected to the interconnect 1018 via memory requests transmitted over the interconnect 1018. In an embodiment, the host processor writes the command stream to the buffer and then transmits a pointer to the start of the command stream to the parallel processing unit 1000. The front-end unit 1004 receives pointers to one or more command streams. The front-end unit 1004 manages the one or more streams, reading commands from the streams and forwarding commands to the various units of the parallel processing unit 1000.

The front-end unit 1004 is coupled to a scheduler unit 1008 that configures the various general processing cluster 1100 modules to process tasks defined by the one or more streams. The scheduler unit 1008 is configured to track state information related to the various tasks managed by the scheduler unit 1008. The state may indicate which general processing cluster 1100 a task is assigned to, whether the task is active or inactive, a priority level associated with the task, and so forth. The scheduler unit 1008 manages the execution of a plurality of tasks on the one or more general processing cluster 1100 modules.

The scheduler unit 1008 is coupled to a work distribution unit 1010 that is configured to dispatch tasks for execution on the general processing cluster 1100 modules. The work distribution unit 1010 may track a number of scheduled tasks received from the scheduler unit 1008. In an embodiment, the work distribution unit 1010 manages a pending task pool and an active task pool for each of the general processing cluster 1100 modules. The pending task pool may comprise a number of slots (e.g., 32 slots) that contain tasks assigned to be processed by a particular general processing cluster 1100. The active task pool may comprise a number of slots (e.g., 4 slots) for tasks that are actively being processed by the general processing cluster 1100 modules. As a general processing cluster 1100 finishes the execution of a task, that task is evicted from the active task pool for the general processing cluster 1100 and one of the other tasks from the pending task pool is selected and scheduled for execution on the general processing cluster 1100. If an active task has been idle on the general processing cluster 1100, such as while waiting for a data dependency to be resolved, then the active task may be evicted from the general processing cluster 1100 and returned to the pending task pool while another task in the pending task pool is selected and scheduled for execution on the general processing cluster 1100.

The work distribution unit 1010 communicates with the one or more general processing cluster 1100 modules via crossbar 1014. The crossbar 1014 is an interconnect network that couples many of the units of the parallel processing unit 1000 to other units of the parallel processing unit 1000. For example, the crossbar 1014 may be configured to couple the work distribution unit 1010 to a particular general processing cluster 1100. Although not shown explicitly, one or more other units of the parallel processing unit 1000 may also be connected to the crossbar 1014 via the hub 1006.

The tasks are managed by the scheduler unit 1008 and dispatched to a general processing cluster 1100 by the work distribution unit 1010. The general processing cluster 1100 is configured to process the task and generate results. The results may be consumed by other tasks within the general processing cluster 1100, routed to a different general processing cluster 1100 via the crossbar 1014, or stored in the memory 1012. The results can be written to the memory 1012 via the memory partition unit 1200 modules, which implement a memory interface for reading and writing data to/from the memory 1012. The results can be transmitted to another parallel processing unit 1000 or CPU via the NVLink 1016. In an embodiment, the parallel processing unit 1000 includes a number U of memory partition unit 1200 modules that is equal to the number of separate and distinct memory 1012 devices coupled to the parallel processing unit 1000. A memory partition unit 1200 will be described in more detail below in conjunction with FIG. 12.

In an embodiment, a host processor executes a driver kernel that implements an application programming interface (API) that enables one or more applications executing on the host processor to schedule operations for execution on the parallel processing unit 1000. In an embodiment, multiple compute applications are simultaneously executed by the parallel processing unit 1000 and the parallel processing unit 1000 provides isolation, quality of service (QoS), and independent address spaces for the multiple compute applications. An application may generate instructions (e.g., API calls) that cause the driver kernel to generate one or more tasks for execution by the parallel processing unit 1000. The driver kernel outputs tasks to one or more streams being processed by the parallel processing unit 1000. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 13.

Figure 11:
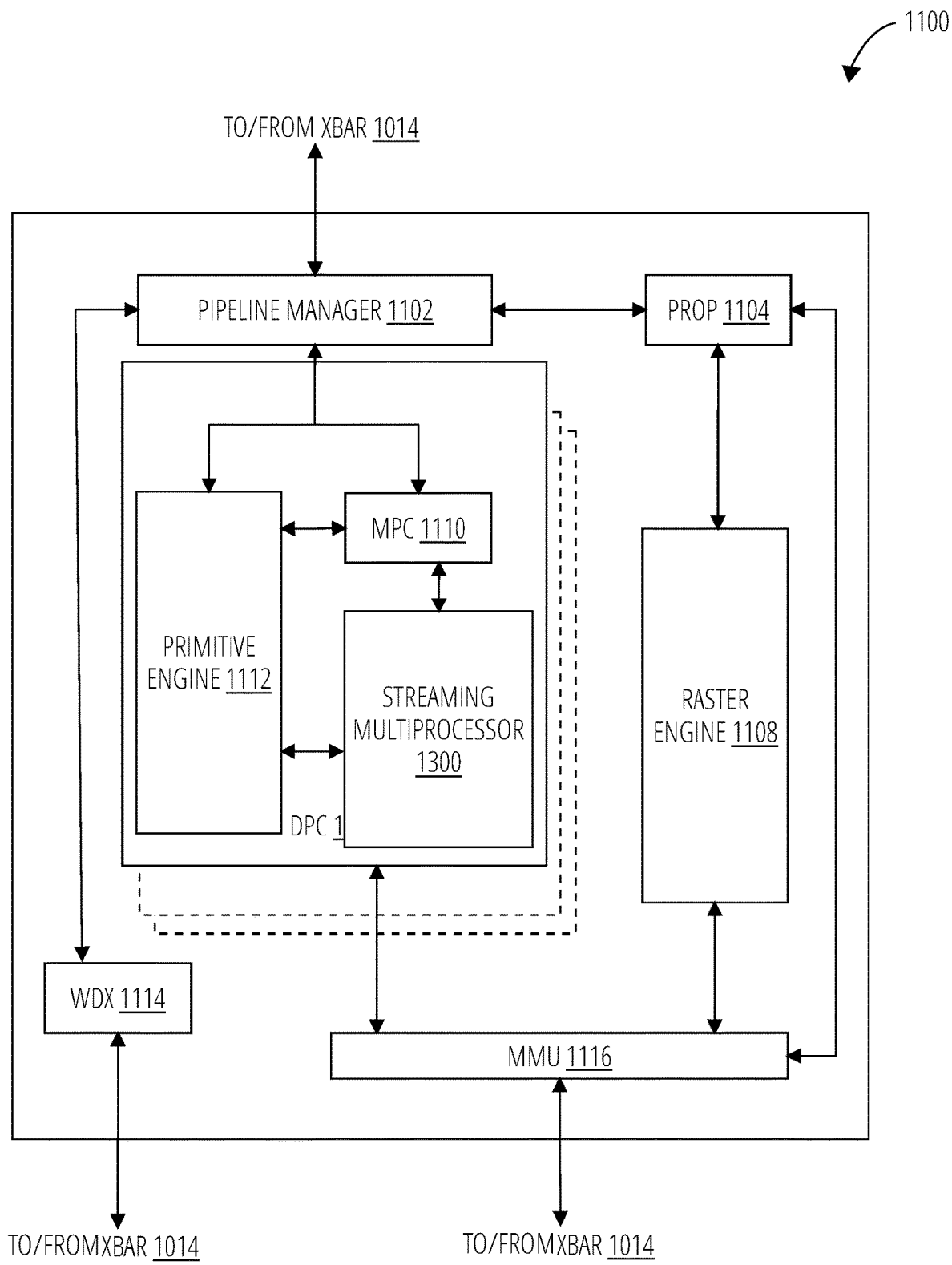
FIG. 11 depicts a general processing cluster 1100 in accordance with one embodiment.

FIG. 11 depicts a general processing cluster 1100 of the parallel processing unit 1000 of FIG. 10, in accordance with an embodiment. As shown in FIG. 11, each general processing cluster 1100 includes a number of hardware units for processing tasks. In an embodiment, each general processing cluster 1100 includes a pipeline manager 1102, a pre-raster operations unit 1104, a raster engine 1108, a work distribution crossbar 1114, a memory management unit 1116, and one or more data processing cluster 1106. It will be appreciated that the general processing cluster 1100 of FIG. 11 may include other hardware units in lieu of or in addition to the units shown in FIG. 11.

In an embodiment, the operation of the general processing cluster 1100 is controlled by the pipeline manager 1102. The pipeline manager 1102 manages the configuration of the one or more data processing cluster 1106 modules for processing tasks allocated to the general processing cluster 1100. In an embodiment, the pipeline manager 1102 may configure at least one of the one or more data processing cluster 1106 modules to implement at least a portion of a graphics rendering pipeline. For example, a data processing cluster 1106 may be configured to execute a vertex shader program on the programmable streaming multiprocessor 1300. The pipeline manager 1102 may also be configured to route packets received from the work distribution unit 1010 to the appropriate logical units within the general processing cluster 1100. For example, some packets may be routed to fixed function hardware units in the pre-raster operations unit 1104 and/or raster engine 1108 while other packets may be routed to the data processing cluster 1106 modules for processing by the primitive engine 1112 or the streaming multiprocessor 1300. In an embodiment, the pipeline manager 1102 may configure at least one of the one or more data processing cluster 1106 modules to implement a neural network model and/or a computing pipeline.

Figure 12:
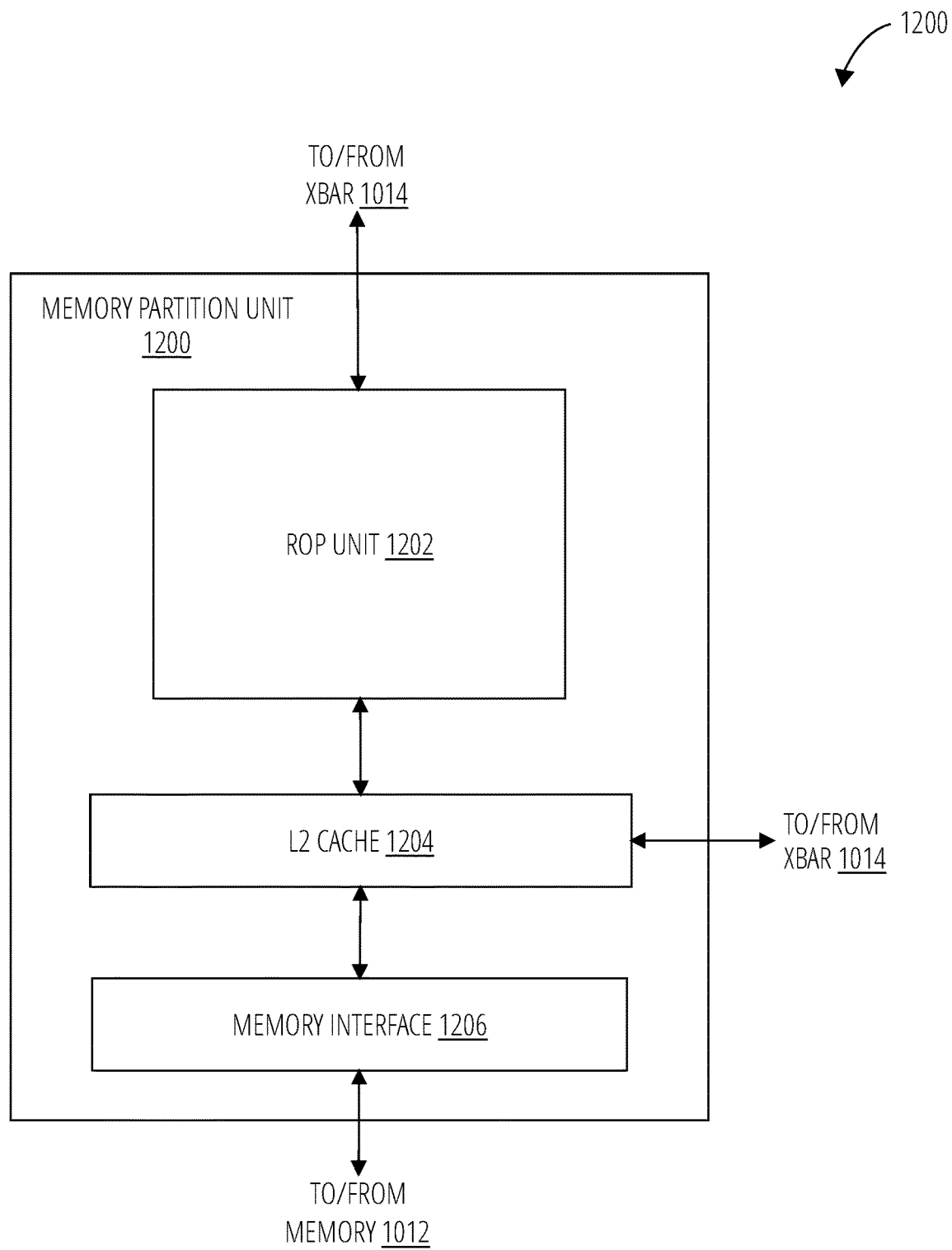
FIG. 12 depicts a memory partition unit 1200 in accordance with one embodiment.

The pre-raster operations unit 1104 is configured to route data generated by the raster engine 1108 and the data processing cluster 1106 modules to a Raster Operations (ROP) unit, described in more detail in conjunction with FIG. 12. The pre-raster operations unit 1104 may also be configured to perform optimizations for color blending, organize pixel data, perform address translations, and the like.

The raster engine 1108 includes a number of fixed function hardware units configured to perform various raster operations. In an embodiment, the raster engine 1108 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1108 comprises fragments to be processed, for example, by a fragment shader implemented within a data processing cluster 1106.

Each data processing cluster 1106 included in the general processing cluster 1100 includes an M-pipe controller 1110, a primitive engine 1112, and one or more streaming multiprocessor 1300 modules. The M-pipe controller 1110 controls the operation of the data processing cluster 1106, routing packets received from the pipeline manager 1102 to the appropriate units in the data processing cluster 1106. For example, packets associated with a vertex may be routed to the primitive engine 1112, which is configured to fetch vertex attributes associated with the vertex from the memory 1012. In contrast, packets associated with a shader program may be transmitted to the streaming multiprocessor 1300.

The streaming multiprocessor 1300 comprises a programmable streaming processor that is configured to process tasks represented by a number of threads. Each streaming multiprocessor 1300 is multi-threaded and configured to execute a plurality of threads (e.g., 32 threads) from a particular group of threads concurrently. In an embodiment, the streaming multiprocessor 1300 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1300 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1300 will be described in more detail below in conjunction with FIG. 13.

The memory management unit 1116 provides an interface between the general processing cluster 1100 and the memory partition unit 1200. The memory management unit 1116 may provide translation of virtual addresses into physical addresses, memory protection, and arbitration of memory requests. In an embodiment, the memory management unit 1116 provides one or more translation lookaside buffers (TLBs) for performing translation of virtual addresses into physical addresses in the memory 1012.

FIG. 12 depicts a memory partition unit 1200 of the parallel processing unit 1000 of FIG. 10, in accordance with an embodiment. As shown in FIG. 12, the memory partition unit 1200 includes a raster operations unit 1202, a level two cache 1204, and a memory interface 1206. The memory interface 1206 is coupled to the memory 1012. Memory interface 1206 may implement 32, 64, 128, 1024-bit data buses, or the like, for high-speed data transfer. In an embodiment, the parallel processing unit 1000 incorporates U memory interface 1206 modules, one memory interface 1206 per pair of memory partition unit 1200 modules, where each pair of memory partition unit 1200 modules is connected to a corresponding memory 1012 device. For example, parallel processing unit 1000 may be connected to up to Y memory 1012 devices, such as high bandwidth memory stacks or graphics double-data-rate, version 5, synchronous dynamic random access memory, or other types of persistent storage.

In an embodiment, the memory interface 1206 implements an HBM2 memory interface and Y equals half U. In an embodiment, the HBM2 memory stacks are located on the same physical package as the parallel processing unit 1000, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1012 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1000 modules process very large datasets and/or run applications for extended periods.

In an embodiment, the parallel processing unit 1000 implements a multi-level memory hierarchy. In an embodiment, the memory partition unit 1200 supports a unified memory to provide a single unified virtual address space for CPU and parallel processing unit 1000 memory, enabling data sharing between virtual memory systems. In an embodiment the frequency of accesses by a parallel processing unit 1000 to memory located on other processors is traced to ensure that memory pages are moved to the physical memory of the parallel processing unit 1000 that is accessing the pages more frequently. In an embodiment, the NVLink 1016 supports address translation services allowing the parallel processing unit 1000 to directly access a CPU's page tables and providing full access to CPU memory by the parallel processing unit 1000.

In an embodiment, copy engines transfer data between multiple parallel processing unit 1000 modules or between parallel processing unit 1000 modules and CPUs. The copy engines can generate page faults for addresses that are not mapped into the page tables. The memory partition unit 1200 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1012 or other system memory may be fetched by the memory partition unit 1200 and stored in the level two cache 1204, which is located on-chip and is shared between the various general processing cluster 1100 modules. As shown, each memory partition unit 1200 includes a portion of the level two cache 1204 associated with a corresponding memory 1012 device. Lower level caches may then be implemented in various units within the general processing cluster 1100 modules. For example, each of the streaming multiprocessor 1300 modules may implement an L1 cache. The L1 cache is private memory that is dedicated to a particular streaming multiprocessor 1300. Data from the level two cache 1204 may be fetched and stored in each of the L1 caches for processing in the functional units of the streaming multiprocessor 1300 modules. The level two cache 1204 is coupled to the memory interface 1206 and the crossbar 1014.

The raster operations unit 1202 performs graphics raster operations related to pixel color, such as color compression, pixel blending, and the like. The raster operations unit 1202 also implements depth testing in conjunction with the raster engine 1108, receiving a depth for a sample location associated with a pixel fragment from the culling engine of the raster engine 1108. The depth is tested against a corresponding depth in a depth buffer for a sample location associated with the fragment. If the fragment passes the depth test for the sample location, then the raster operations unit 1202 updates the depth buffer and transmits a result of the depth test to the raster engine 1108. It will be appreciated that the number of partition memory partition unit 1200 modules may be different than the number of general processing cluster 1100 modules and, therefore, each raster operations unit 1202 may be coupled to each of the general processing cluster 1100 modules. The raster operations unit 1202 tracks packets received from the different general processing cluster 1100 modules and determines which general processing cluster 1100 that a result generated by the raster operations unit 1202 is routed to through the crossbar 1014. Although the raster operations unit 1202 is included within the memory partition unit 1200 in FIG. 12, in other embodiment, the raster operations unit 1202 may be outside of the memory partition unit 1200. For example, the raster operations unit 1202 may reside in the general processing cluster 1100 or another unit.

Figure 13:
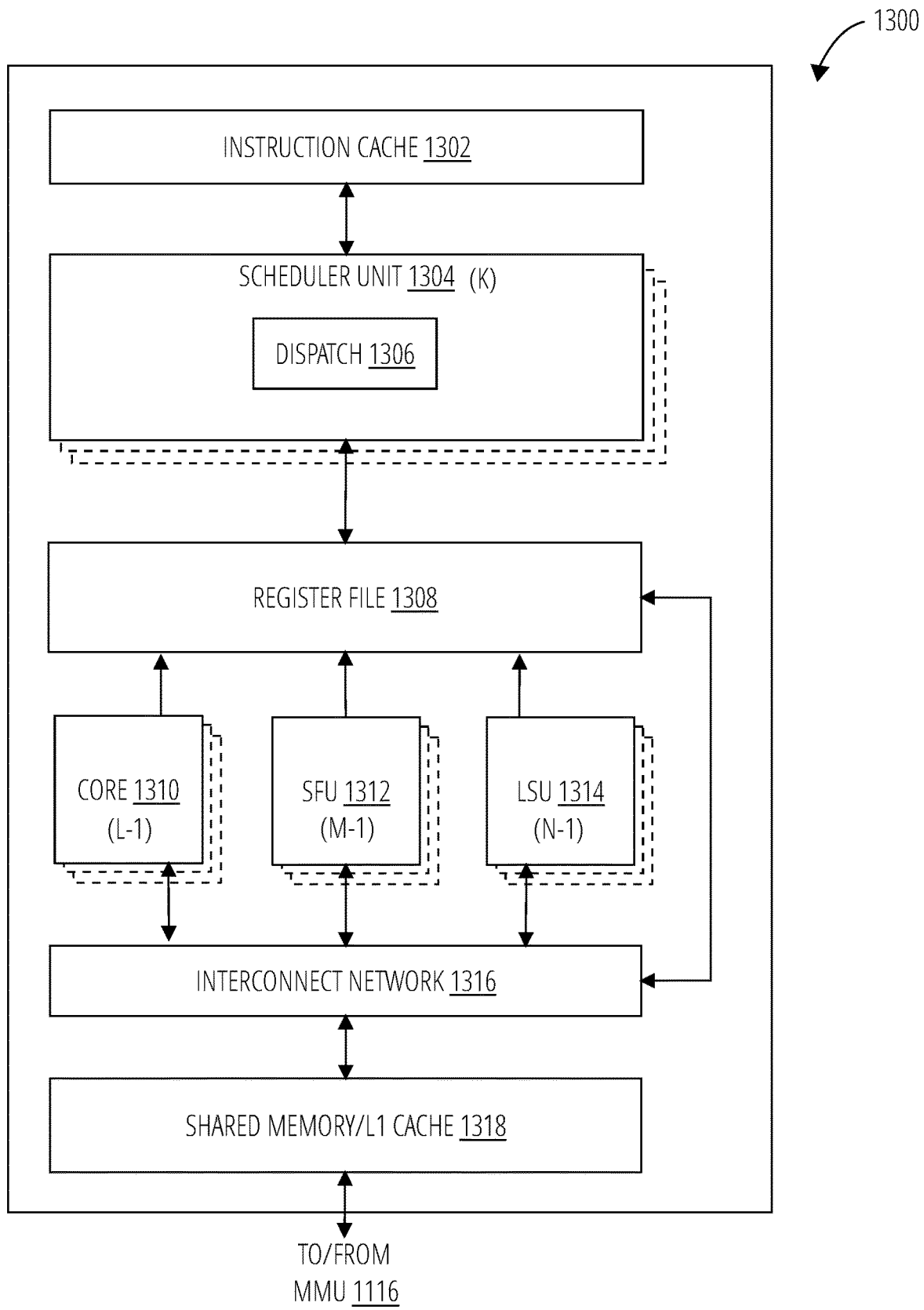
FIG. 13 depicts a streaming multiprocessor 1300 in accordance with one embodiment.

FIG. 13 depicts the streaming multiprocessor 1300 of FIG. 11, in accordance with an embodiment. As shown in FIG. 13, the streaming multiprocessor 1300 includes an instruction cache 1302, one or more scheduler unit 1304 modules (e.g., such as scheduler unit 1008), a register file 1308, one or more processing core 1310 modules, one or more special function unit 1312 modules, one or more load/store unit 1314 modules, an interconnect network 1316, and a shared memory/L1 cache 1318.

As described above, the work distribution unit 1010 dispatches tasks for execution on the general processing cluster 1100 modules of the parallel processing unit 1000. The tasks are allocated to a particular data processing cluster 1106 within a general processing cluster 1100 and, if the task is associated with a shader program, the task may be allocated to a streaming multiprocessor 1300. The scheduler unit 1008 receives the tasks from the work distribution unit 1010 and manages instruction scheduling for one or more thread blocks assigned to the streaming multiprocessor 1300. The scheduler unit 1304 schedules thread blocks for execution as warps of parallel threads, where each thread block is allocated at least one warp. In an embodiment, each warp executes 32 threads. The scheduler unit 1304 may manage a plurality of different thread blocks, allocating the warps to the different thread blocks and then dispatching instructions from the plurality of different cooperative groups to the various functional units (e.g., core 1310 modules, special function unit 1312 modules, and load/store unit 1314 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1306 unit is configured within the scheduler unit 1304 to transmit instructions to one or more of the functional units. In one embodiment, the scheduler unit 1304 includes two dispatch 1306 units that enable two different instructions from the same warp to be dispatched during each clock cycle. In alternative embodiments, each scheduler unit 1304 may include a single dispatch 1306 unit or additional dispatch 1306 units.

Each streaming multiprocessor 1300 includes a register file 1308 that provides a set of registers for the functional units of the streaming multiprocessor 1300. In an embodiment, the register file 1308 is divided between each of the functional units such that each functional unit is allocated a dedicated portion of the register file 1308. In another embodiment, the register file 1308 is divided between the different warps being executed by the streaming multiprocessor 1300. The register file 1308 provides temporary storage for operands connected to the data paths of the functional units.

Each streaming multiprocessor 1300 comprises L processing core 1310 modules. In an embodiment, the streaming multiprocessor 1300 includes a large number (e.g., 128, etc.) of distinct processing core 1310 modules. Each core 1310 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1310 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1310 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A'B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1300 also comprises M special function unit 1312 modules that perform special functions (e.g., attribute evaluation, reciprocal square root, and the like). In an embodiment, the special function unit 1312 modules may include a tree traversal unit configured to traverse a hierarchical tree data structure. In an embodiment, the special function unit 1312 modules may include texture unit configured to perform texture map filtering operations. In an embodiment, the texture units are configured to load texture maps (e.g., a 2D array of texels) from the memory 1012 and sample the texture maps to produce sampled texture values for use in shader programs executed by the streaming multiprocessor 1300. In an embodiment, the texture maps are stored in the shared memory/L1 cache 1318. The texture units implement texture operations such as filtering operations using mip-maps (e.g., texture maps of varying levels of detail). In an embodiment, each streaming multiprocessor 1300 includes two texture units.

Each streaming multiprocessor 1300 also comprises N load/store unit 1314 modules that implement load and store operations between the shared memory/L1 cache 1318 and the register file 1308. Each streaming multiprocessor 1300 includes an interconnect network 1316 that connects each of the functional units to the register file 1308 and the load/store unit 1314 to the register file 1308 and shared memory/L1 cache 1318. In an embodiment, the interconnect network 1316 is a crossbar that can be configured to connect any of the functional units to any of the registers in the register file 1308 and connect the load/store unit 1314 modules to the register file 1308 and memory locations in shared memory/L1 cache 1318.

The shared memory/L1 cache 1318 is an array of on-chip memory that allows for data storage and communication between the streaming multiprocessor 1300 and the primitive engine 1112 and between threads in the streaming multiprocessor 1300. In an embodiment, the shared memory/L1 cache 1318 comprises 128 KB of storage capacity and is in the path from the streaming multiprocessor 1300 to the memory partition unit 1200. The shared memory/L1 cache 1318 can be used to cache reads and writes. One or more of the shared memory/L1 cache 1318, level two cache 1204, and memory 1012 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1318 enables the shared memory/L1 cache 1318 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 10, are bypassed, creating a much simpler programming model. In the general purpose parallel computation configuration, the work distribution unit 1010 assigns and distributes blocks of threads directly to the data processing cluster 1106 modules. The threads in a block execute the same program, using a unique thread ID in the calculation to ensure each thread generates unique results, using the streaming multiprocessor 1300 to execute the program and perform calculations, shared memory/L1 cache 1318 to communicate between threads, and the load/store unit 1314 to read and write global memory through the shared memory/L1 cache 1318 and the memory partition unit 1200. When configured for general purpose parallel computation, the streaming multiprocessor 1300 can also write commands that the scheduler unit 1008 can use to launch new work on the data processing cluster 1106 modules.

The parallel processing unit 1000 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1000 is embodied on a single semiconductor substrate. In another embodiment, the parallel processing unit 1000 is included in a system-on-a-chip (SoC) along with one or more other devices such as additional parallel processing unit 1000 modules, the memory 1012, a reduced instruction set computer (RISC) CPU, a memory management unit (MMU), a digital-to-analog converter (DAC), and the like.

In an embodiment, the parallel processing unit 1000 may be included on a graphics card that includes one or more memory devices. The graphics card may be configured to interface with a PCIe slot on a motherboard of a desktop computer. In yet another embodiment, the parallel processing unit 1000 may be an integrated graphics processing unit (iGPU) or parallel processor included in the chipset of the motherboard.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 14:
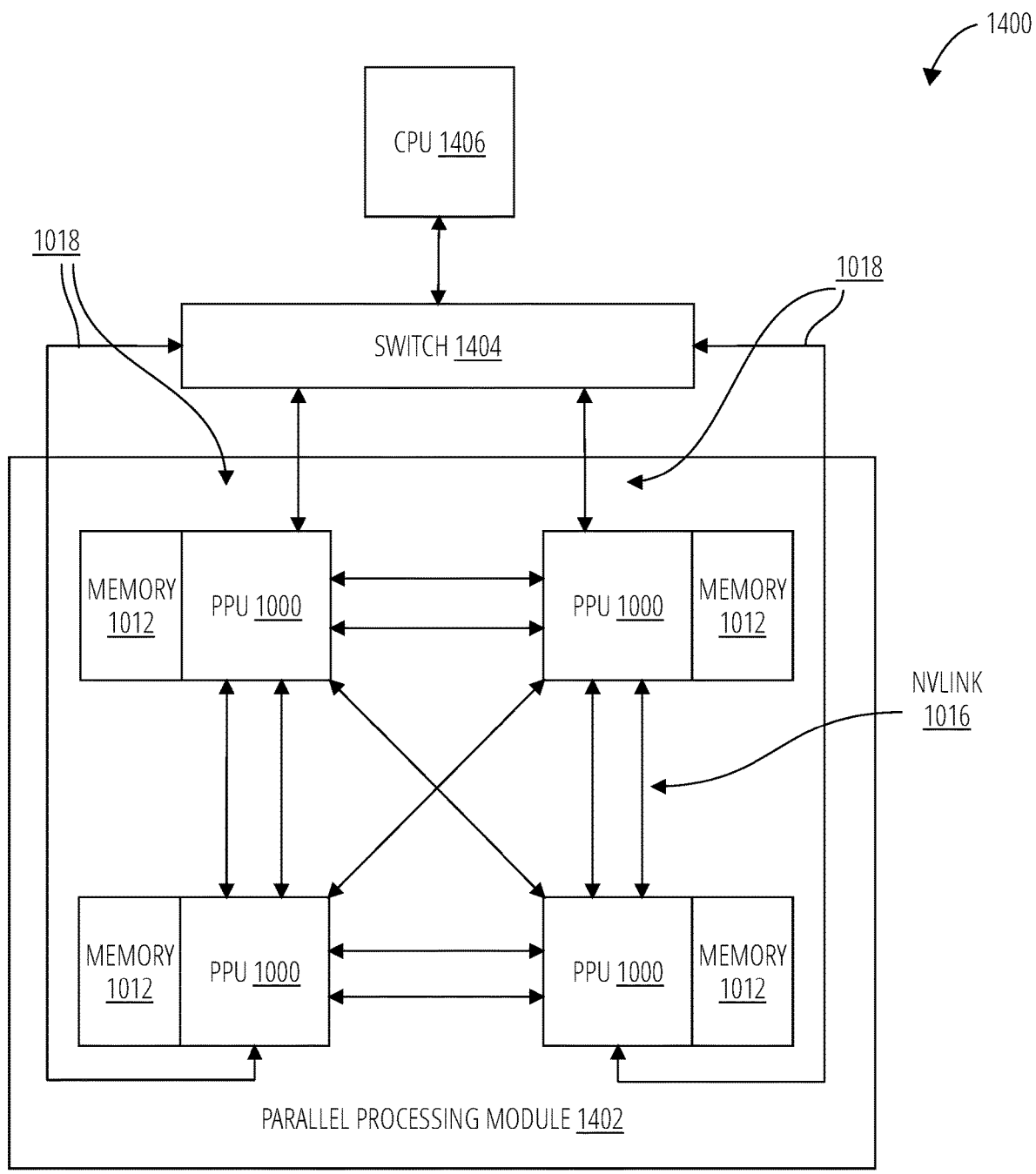
FIG. 14 depicts a processing system 1400 in accordance with one embodiment.

FIG. 14 is a conceptual diagram of a processing system 1400 implemented using the parallel processing unit 1000 of FIG. 10, in accordance with an embodiment. The processing system 1400 includes a central processing unit 1406, switch 1404, and multiple parallel processing unit 1000 modules each and respective memory 1012 modules. The NVLink 1016 provides high-speed communication links between each of the parallel processing unit 1000 modules. Although a particular number of NVLink 1016 and interconnect 1018 connections are illustrated in FIG. 14, the number of connections to each parallel processing unit 1000 and the central processing unit 1406 may vary. The switch 1404 interfaces between the interconnect 1018 and the central processing unit 1406. The parallel processing unit 1000 modules, memory 1012 modules, and NVLink 1016 connections may be situated on a single semiconductor platform to form a parallel processing module 1402. In an embodiment, the switch 1404 supports two or more protocols to interface between various different connections and/or links.

In another embodiment (not shown), the NVLink 1016 provides one or more high-speed communication links between each of the parallel processing unit 1000 modules and the central processing unit 1406 and the switch 1404 interfaces between the interconnect 1018 and each of the parallel processing unit 1000 modules. The parallel processing unit 1000 modules, memory 1012 modules, and interconnect 1018 may be situated on a single semiconductor platform to form a parallel processing module 1402. In yet another embodiment (not shown), the interconnect 1018 provides one or more communication links between each of the parallel processing unit 1000 modules and the central processing unit 1406 and the switch 1404 interfaces between each of the parallel processing unit 1000 modules using the NVLink 1016 to provide one or more high-speed communication links between the parallel processing unit 1000 modules. In another embodiment (not shown), the NVLink 1016 provides one or more high-speed communication links between the parallel processing unit 1000 modules and the central processing unit 1406 through the switch 1404. In yet another embodiment (not shown), the interconnect 1018 provides one or more communication links between each of the parallel processing unit 1000 modules directly. One or more of the NVLink 1016 high-speed communication links may be implemented as a physical NVLink interconnect or either an on-chip or on-die interconnect using the same protocol as the NVLink 1016.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1402 may be implemented as a circuit board substrate and each of the parallel processing unit 1000 modules and/or memory 1012 modules may be packaged devices. In an embodiment, the central processing unit 1406, switch 1404, and the parallel processing module 1402 are situated on a single semiconductor platform.

In an embodiment, the signaling rate of each NVLink 1016 is 20 to 25 Gigabits/second and each parallel processing unit 1000 includes six NVLink 1016 interfaces (as shown in FIG. 14, five NVLink 1016 interfaces are included for each parallel processing unit 1000). Each NVLink 1016 provides a data transfer rate of 25 Gigabytes/second in each direction, with six links providing 300 Gigabytes/second. The NVLink 1016 can be used exclusively for PPU-to-PPU communication as shown in FIG. 14, or some combination of PPU-to-PPU and PPU-to-CPU, when the central processing unit 1406 also includes one or more NVLink 1016 interfaces.

In an embodiment, the NVLink 1016 allows direct load/store/atomic access from the central processing unit 1406 to each parallel processing unit 1000 module's memory 1012. In an embodiment, the NVLink 1016 supports coherency operations, allowing data read from the memory 1012 modules to be stored in the cache hierarchy of the central processing unit 1406, reducing cache access latency for the central processing unit 1406. In an embodiment, the NVLink 1016 includes support for Address Translation Services (ATS), allowing the parallel processing unit 1000 to directly access page tables within the central processing unit 1406. One or more of the NVLink 1016 may also be configured to operate in a low-power mode.

Figure 15:
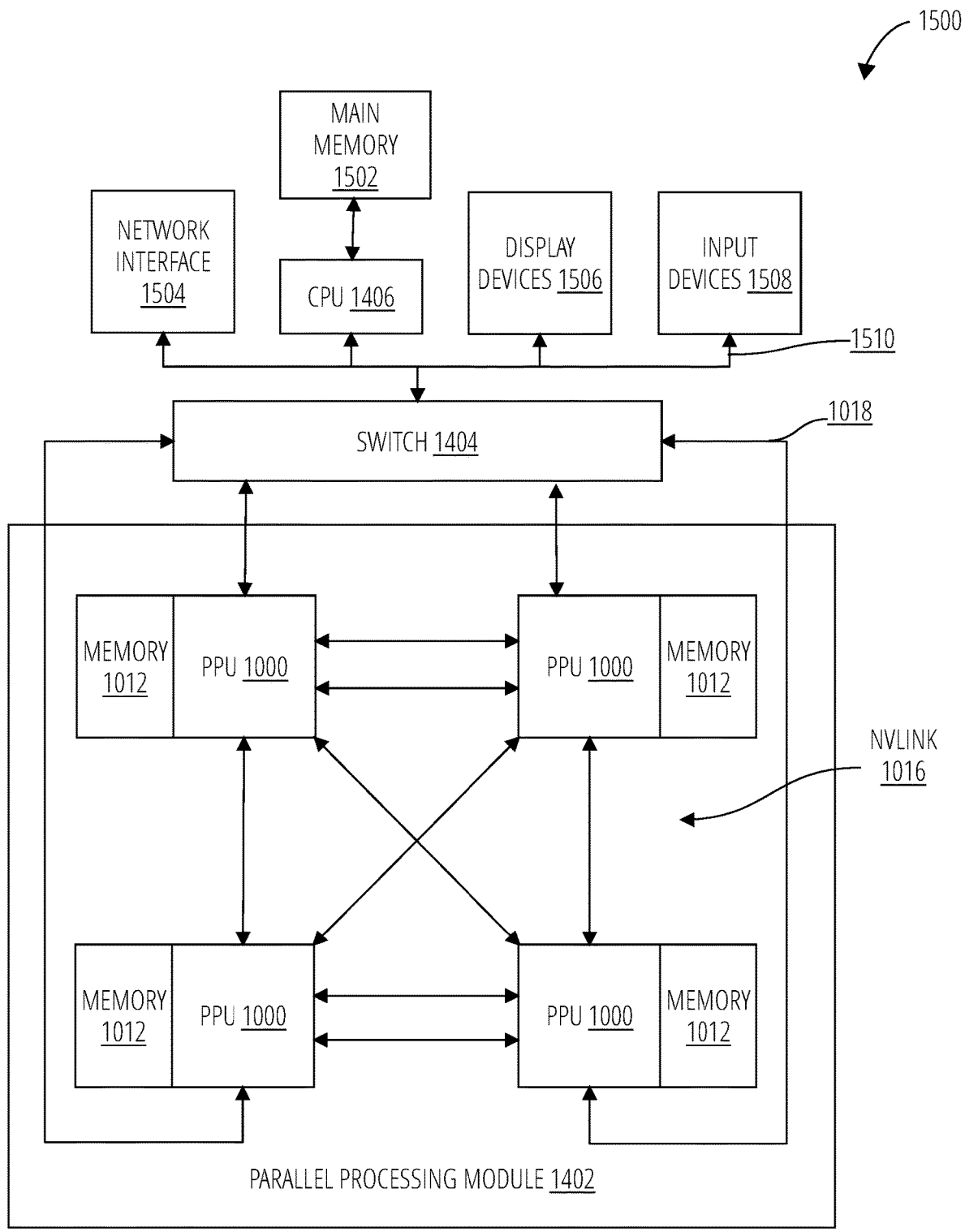
FIG. 15 depicts an exemplary processing system 1500 in accordance with another embodiment.

FIG. 15 depicts an exemplary processing system 1500 in which the various architecture and/or functionality of the various previous embodiments may be implemented. As shown, an exemplary processing system 1500 is provided including at least one central processing unit 1406 that is connected to a communications bus 1510. The communication communications bus 1510 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1500 also includes a main memory 1502. Control logic (software) and data are stored in the main memory 1502 which may take the form of random access memory (RAM).

The exemplary processing system 1500 also includes input devices 1508, the parallel processing module 1402, and display devices 1506, e.g. one or more holographic displays. User input may be received from the input devices 1508, e.g., keyboard, mouse, touchpad, microphone, and the like. Each of the foregoing modules and/or devices may even be situated on a single semiconductor platform to form the exemplary processing system 1500. Alternately, the various modules may also be situated separately or in various combinations of semiconductor platforms per the desires of the user.

Further, the exemplary processing system 1500 may be coupled to a network (e.g., a telecommunications network, local area network (LAN), wireless network, wide area network (WAN) such as the Internet, peer-to-peer network, cable network, or the like) through a network interface 1504 for communication purposes.

The exemplary processing system 1500 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1502 and/or the secondary storage. Such computer programs, when executed, enable the exemplary processing system 1500 to perform various functions. The main memory 1502, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1500 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 16:
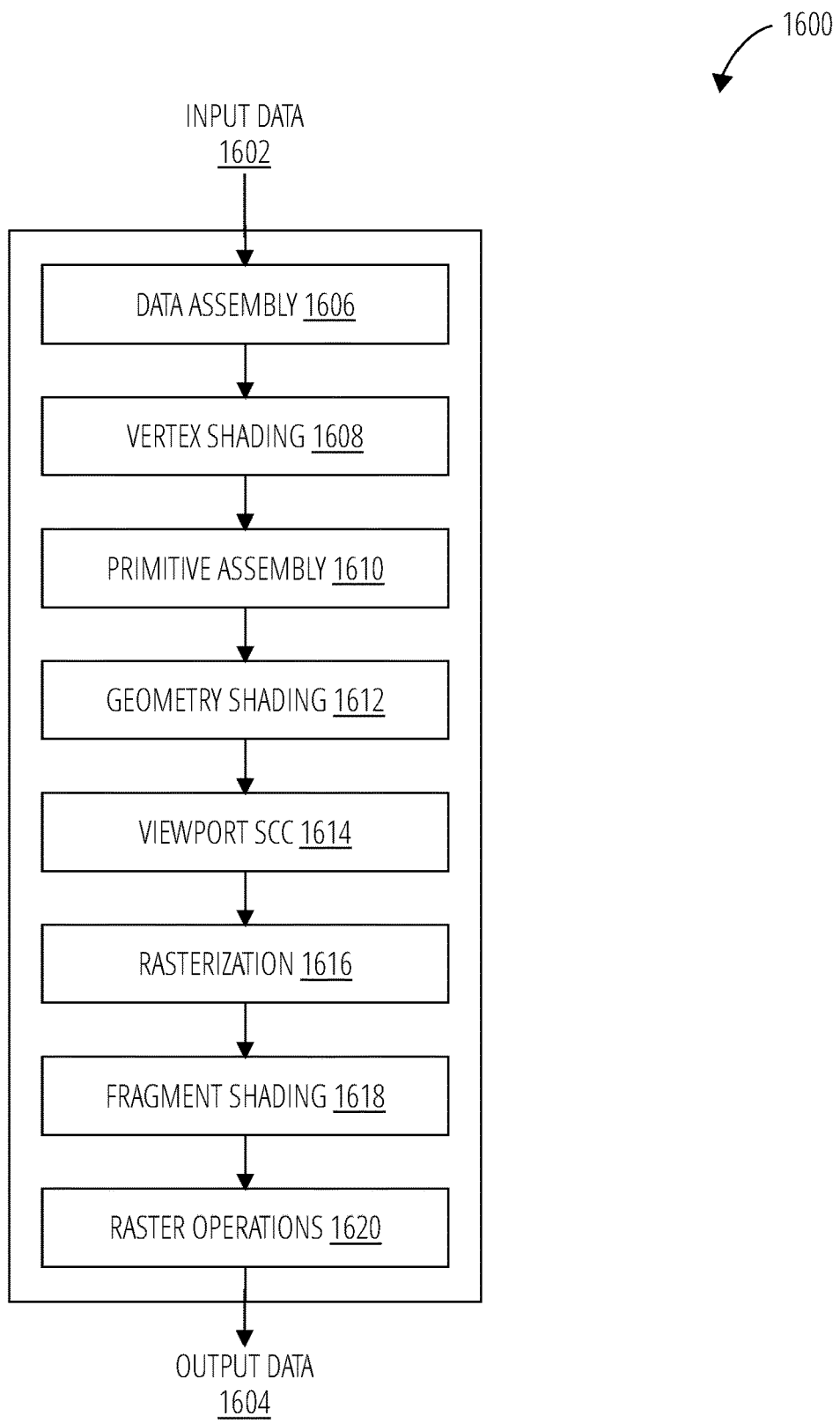
FIG. 16 depicts a graphics processing pipeline 1600 in accordance with one embodiment.

FIG. 16 is a conceptual diagram of a graphics processing pipeline 1600 implemented by the parallel processing unit 1000 of FIG. 10, in accordance with an embodiment. In an embodiment, the parallel processing unit 1000 comprises a graphics processing unit (GPU). The parallel processing unit 1000 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1000 can be configured to process the graphics primitives to generate a frame buffer (e.g., pixel data for each of the pixels of the display).

An application writes model data for a scene (e.g., a collection of vertices and attributes) to a memory such as a system memory or memory 1012. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1300 modules of the parallel processing unit 1000 including one or more of a vertex shader, hull shader, domain shader, geometry shader, and a pixel shader. For example, one or more of the streaming multiprocessor 1300 modules may be configured to execute a vertex shader program that processes a number of vertices defined by the model data. In an embodiment, the different streaming multiprocessor 1300 modules may be configured to execute different shader programs concurrently. For example, a first subset of streaming multiprocessor 1300 modules may be configured to execute a vertex shader program while a second subset of streaming multiprocessor 1300 modules may be configured to execute a pixel shader program. The first subset of streaming multiprocessor 1300 modules processes vertex data to produce processed vertex data and writes the processed vertex data to the level two cache 1204 and/or the memory 1012. After the processed vertex data is rasterized (e.g., transformed from three-dimensional data into two-dimensional data in screen space) to produce fragment data, the second subset of streaming multiprocessor 1300 modules executes a pixel shader to produce processed fragment data, which is then blended with other processed fragment data and written to the frame buffer in memory 1012. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1600 receives input data 601 that is transmitted from one stage to the next stage of the graphics processing pipeline 1600 to generate output data 1604. In an embodiment, the graphics processing pipeline 1600 may represent a graphics processing pipeline defined by the OpenGL® API. As an option, the graphics processing pipeline 1600 may be implemented in the context of the functionality and architecture of the previous Figures and/or any subsequent Figure(s).

As shown in FIG. 16, the graphics processing pipeline 1600 comprises a pipeline architecture that includes a number of stages. The stages include, but are not limited to, a data assembly 1606 stage, a vertex shading 1608 stage, a primitive assembly 1610 stage, a geometry shading 1612 stage, a viewport SCC 1614 stage, a rasterization 1616 stage, a fragment shading 1618 stage, and a raster operations 1620 stage. In an embodiment, the input data 1602 comprises commands that configure the processing units to implement the stages of the graphics processing pipeline 1600 and geometric primitives (e.g., points, lines, triangles, quads, triangle strips or fans, etc.) to be processed by the stages. The output data 1604 may comprise pixel data (e.g., color data) that is copied into a frame buffer or other type of surface data structure in a memory.

The data assembly 1606 stage receives the input data 1602 that specifies vertex data for high-order surfaces, primitives, or the like. The data assembly 1606 stage collects the vertex data in a temporary storage or queue, such as by receiving a command from the host processor that includes a pointer to a buffer in memory and reading the vertex data from the buffer. The vertex data is then transmitted to the vertex shading 1608 stage for processing.

The vertex shading 1608 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1608 stage may manipulate individual vertex attributes such as position, color, texture coordinates, and the like. In other words, the vertex shading 1608 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1608 stage generates transformed vertex data that is transmitted to the primitive assembly 1610 stage.

The primitive assembly 1610 stage collects vertices output by the vertex shading 1608 stage and groups the vertices into geometric primitives for processing by the geometry shading 1612 stage. For example, the primitive assembly 1610 stage may be configured to group every three consecutive vertices as a geometric primitive (e.g., a triangle) for transmission to the geometry shading 1612 stage. In some embodiments, specific vertices may be reused for consecutive geometric primitives (e.g., two consecutive triangles in a triangle strip may share two vertices). The primitive assembly 1610 stage transmits geometric primitives (e.g., a collection of associated vertices) to the geometry shading 1612 stage.

The geometry shading 1612 stage processes geometric primitives by performing a set of operations (e.g., a geometry shader or program) on the geometric primitives. Tessellation operations may generate one or more geometric primitives from each geometric primitive. In other words, the geometry shading 1612 stage may subdivide each geometric primitive into a finer mesh of two or more geometric primitives for processing by the rest of the graphics processing pipeline 1600. The geometry shading 1612 stage transmits geometric primitives to the viewport SCC 1614 stage.

In an embodiment, the graphics processing pipeline 1600 may operate within a streaming multiprocessor and the vertex shading 1608 stage, the primitive assembly 1610 stage, the geometry shading 1612 stage, the fragment shading 1618 stage, and/or hardware/software associated therewith, may sequentially perform processing operations. Once the sequential processing operations are complete, in an embodiment, the viewport SCC 1614 stage may utilize the data. In an embodiment, primitive data processed by one or more of the stages in the graphics processing pipeline 1600 may be written to a cache (e.g. L1 cache, a vertex cache, etc.). In this case, in an embodiment, the viewport SCC 1614 stage may access the data in the cache. In an embodiment, the viewport SCC 1614 stage and the rasterization 1616 stage are implemented as fixed function circuitry.

The viewport SCC 1614 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1616 stage.

The rasterization 1616 stage converts the 3D geometric primitives into 2D fragments (e.g. capable of being utilized for display, etc.). The rasterization 1616 stage may be configured to utilize the vertices of the geometric primitives to setup a set of plane equations from which various attributes can be interpolated. The rasterization 1616 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1616 stage generates fragment data (e.g., interpolated vertex attributes associated with a particular sample location for each covered pixel) that are transmitted to the fragment shading 1618 stage.

The fragment shading 1618 stage processes fragment data by performing a set of operations (e.g., a fragment shader or a program) on each of the fragments. The fragment shading 1618 stage may generate pixel data (e.g., color values) for the fragment such as by performing lighting operations or sampling texture maps using interpolated texture coordinates for the fragment. The fragment shading 1618 stage generates pixel data that is transmitted to the raster operations 1620 stage.

The raster operations 1620 stage may perform various operations on the pixel data such as performing alpha tests, stencil tests, and blending the pixel data with other pixel data corresponding to other fragments associated with the pixel. When the raster operations 1620 stage has finished processing the pixel data (e.g., the output data 1604), the pixel data may be written to a render target such as a frame buffer, a color buffer, or the like.

It will be appreciated that one or more additional stages may be included in the graphics processing pipeline 1600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1612 stage). Other types of graphics processing pipelines are contemplated as being within the scope of the present disclosure. Furthermore, any of the stages of the graphics processing pipeline 1600 may be implemented by one or more dedicated hardware units within a graphics processor such as parallel processing unit 1000. Other stages of the graphics processing pipeline 1600 may be implemented by programmable hardware units such as the streaming multiprocessor 1300 of the parallel processing unit 1000.

The graphics processing pipeline 1600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1000. The API provides an abstraction for a programmer that lets a programmer utilize specialized graphics hardware, such as the parallel processing unit 1000, to generate the graphical data without requiring the programmer to utilize the specific instruction set for the parallel processing unit 1000. The application may include an API call that is routed to the device driver for the parallel processing unit 1000. The device driver interprets the API call and performs various operations to respond to the API call. In some instances, the device driver may perform operations by executing instructions on the CPU. In other instances, the device driver may perform operations, at least in part, by launching operations on the parallel processing unit 1000 utilizing an input/output interface between the CPU and the parallel processing unit 1000. In an embodiment, the device driver is configured to implement the graphics processing pipeline 1600 utilizing the hardware of the parallel processing unit 1000.

Various programs may be executed within the parallel processing unit 1000 in order to implement the various stages of the graphics processing pipeline 1600. For example, the device driver may launch a kernel on the parallel processing unit 1000 to perform the vertex shading 1608 stage on one streaming multiprocessor 1300 (or multiple streaming multiprocessor 1300 modules). The device driver (or the initial kernel executed by the parallel processing unit 1000) may also launch other kernels on the parallel processing unit 1000 to perform other stages of the graphics processing pipeline 1600, such as the geometry shading 1612 stage and the fragment shading 1618 stage. In addition, some of the stages of the graphics processing pipeline 1600 may be implemented on fixed unit hardware such as a rasterizer or a data assembler implemented within the parallel processing unit 1000. It will be appreciated that results from one kernel may be processed by one or more intervening fixed function hardware units before being processed by a subsequent kernel on a streaming multiprocessor 1300.

Example Computing Device

Figure 17A:
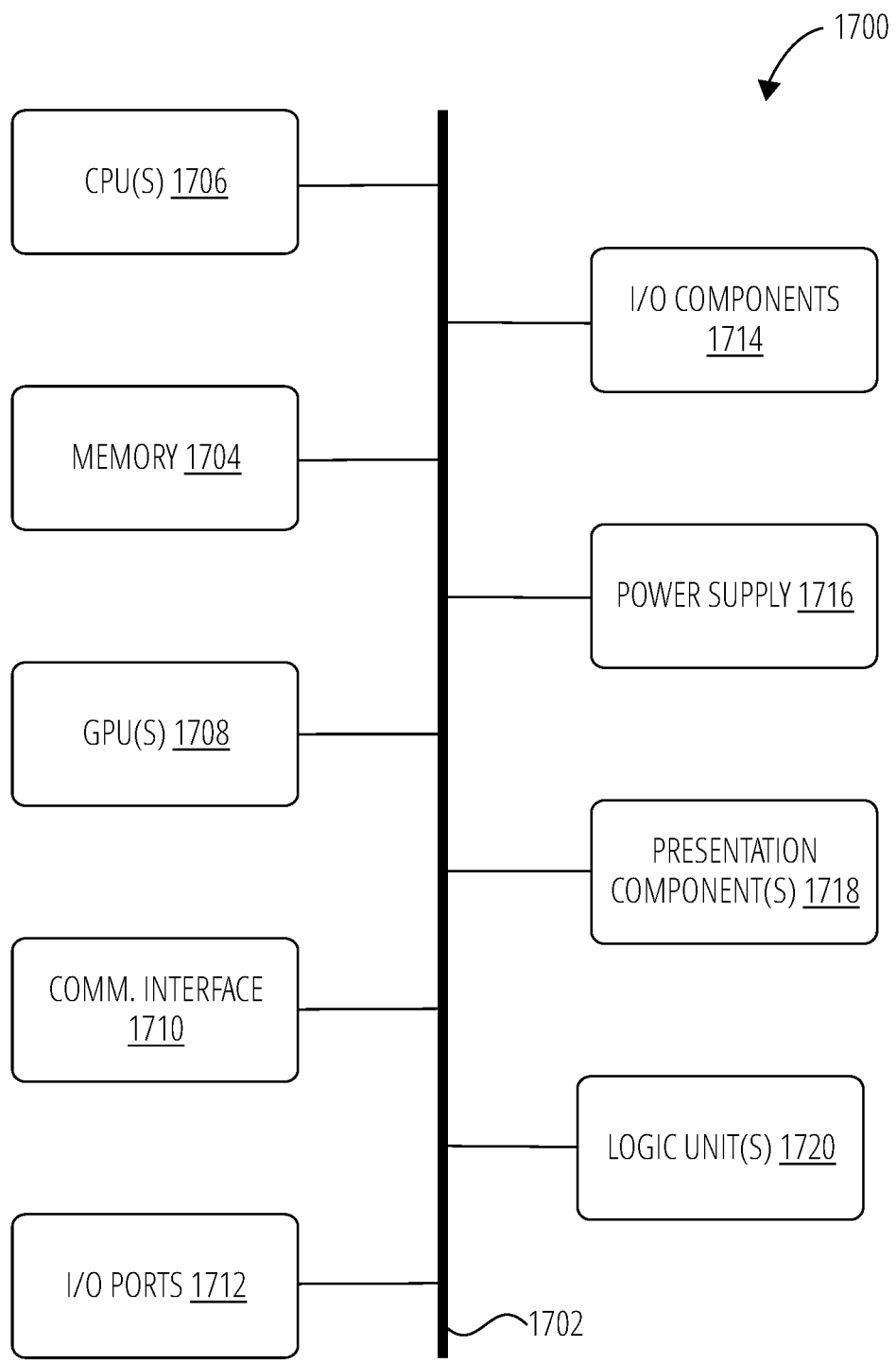
FIG. 17A is a block diagram of an example computing system 1700 suitable for use in implementing some embodiments of the present disclosure.

FIG. 17A is a block diagram of an example computing system 1700 suitable for use in implementing some embodiments of the present disclosure. computing system 1700 may include an interconnect system 1702 that directly or indirectly couples the following devices: memory 1704, one or more central processing units (CPU(s) 1706), one or more graphics processing units (GPU(s) 1708), a communication interface 1710, input/output ports (I/O ports 1712), input/output components (I/O components 1714), a power supply 1716, one or more presentation component(s) 1718 (e.g., display(s)), and one or more logic unit(s) 1720.

Although the various blocks of FIG. 17A are shown as connected via the interconnect system 1702 with lines, this is not intended to be limiting and is for clarity only. For example, in some embodiments, a presentation component 1718, such as a display device, may be considered an I/O component 1714 (e.g., if the display is a touch screen). As another example, the CPU(s) 1706 and/or GPU(s) 1708 may include memory (e.g., the memory 1704 may be representative of a storage device in addition to the memory of the GPU(s) 1708, the CPU(s) 1706, and/or other components). In other words, the computing device of FIG. 17A is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 17A.

The interconnect system 1702 may represent one or more links or busses, such as an address bus, a data bus, a control bus, or a combination thereof. The interconnect system 1702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU(s) 1706 may be directly connected to the memory 1704. Further, the CPU(s) 1706 may be directly connected to the GPU(s) 1708. Where there is direct, or point-to-point connection between components, the interconnect system 1702 may include a PCIe link to carry out the connection. In these examples, a PCI bus need not be included in the computing system 1700.

The memory 1704 may include any of a variety of computer-readable media. The computer-readable media may be any available media that may be accessed by the computing system 1700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing system 1700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1706 may be configured to execute at least some of the computer-readable instructions to control one or more components of the computing system 1700 to perform one or more of the methods and/or processes described herein. The CPU(s) 1706 may each include one or more cores (e.g., one, two, four, eight, twenty-eight, seventy-two, etc.) that are capable of handling a multitude of software threads simultaneously. The CPU(s) 1706 may include any type of processor, and may include different types of processors depending on the type of computing system 1700 implemented (e.g., processors with fewer cores for mobile devices and processors with more cores for servers). For example, depending on the type of computing system 1700, the processor may be an Advanced RISC Machines (ARM) processor implemented using Reduced Instruction Set Computing (RISC) or an x86 processor implemented using Complex Instruction Set Computing (CISC). The computing system 1700 may include one or more CPU(s) 1706 in addition to one or more microprocessors or supplementary co-processors, such as math co-processors.

In addition to or alternatively from the CPU(s) 1706, the GPU(s) 1708 may be configured to execute at least some of the computer-readable instructions to control one or more components of the computing system 1700 to perform one or more of the methods and/or processes described herein. One or more of the GPU(s) 1708 may be an integrated GPU (e.g., with one or more of the CPU(s) 1706 and/or one or more of the GPU(s) 1708 may be a discrete GPU. In embodiments, one or more of the GPU(s) 1708 may be a coprocessor of one or more of the CPU(s) 1706. The GPU(s) 1708 may be used by the computing system 1700 to render graphics (e.g., 3D graphics) or perform general purpose computations. For example, the GPU(s) 1708 may be used for General-Purpose computing on GPUs (GPGPU). The GPU(s) 1708 may include hundreds or thousands of cores that are capable of handling hundreds or thousands of software threads simultaneously. The GPU(s) 1708 may generate pixel data for output images in response to rendering commands (e.g., rendering commands from the CPU(s) 1706 received via a host interface). The GPU(s) 1708 may include graphics memory, such as display memory, for storing pixel data or any other suitable data, such as GPGPU data. The display memory may be included as part of the memory 1704. The GPU(s) 1708 may include two or more GPUs operating in parallel (e.g., via a link). The link may directly connect the GPUs (e.g., using NVLINK) or may connect the GPUs through a switch (e.g., using NVSwitch). When combined together, each GPU 1708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1706 and/or the GPU(s) 1708, the logic unit(s) 1720 may be configured to execute at least some of the computer-readable instructions to control one or more components of the computing system 1700 to perform one or more of the methods and/or processes described herein. In embodiments, the CPU(s) 1706, the GPU(s) 1708, and/or the logic unit(s) 1720 may discretely or jointly perform any combination of the methods, processes and/or portions thereof. One or more of the logic unit(s) 1720 may be part of and/or integrated in one or more of the CPU(s) 1706 and/or the GPU(s) 1708 and/or one or more of the logic unit(s) 1720 may be discrete components or otherwise external to the CPU(s) 1706 and/or the GPU(s) 1708. In embodiments, one or more of the logic unit(s) 1720 may be a coprocessor of one or more of the CPU(s) 1706 and/or one or more of the GPU(s) 1708.

Examples of the logic unit(s) 1720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1710 may include one or more receivers, transmitters, and/or transceivers that enable the computing system 1700 to communicate with other computing devices via an electronic communication network, included wired and/or wireless communications. The communication interface 1710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1712 may enable the computing system 1700 to be logically coupled to other devices including the I/O components 1714, the presentation component(s) 1718, and/or other components, some of which may be built in to (e.g., integrated in) the computing system 1700. Illustrative I/O components 1714 include a microphone, mouse, keyboard, joystick, game pad, game controller, satellite dish, scanner, printer, wireless device, etc. The I/O components 1714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing system 1700. The computing system 1700 may be include depth cameras, such as stereoscopic camera systems, infrared camera systems, RGB camera systems, touchscreen technology, and combinations of these, for gesture detection and recognition. Additionally, the computing system 1700 may include accelerometers or gyroscopes (e.g., as part of an inertia measurement unit (IMU)) that enable detection of motion. In some examples, the output of the accelerometers or gyroscopes may be used by the computing system 1700 to render immersive augmented reality or virtual reality.

The power supply 1716 may include a hard-wired power supply, a battery power supply, or a combination thereof. The power supply 1716 may provide power to the computing system 1700 to enable the components of the computing system 1700 to operate.

The presentation component(s) 1718 may include a display (e.g., a monitor, a touch screen, a television screen, a heads-up-display (HUD), other display types, or a combination thereof), speakers, and/or other presentation components. The presentation component(s) 1718 may receive data from other components (e.g., the GPU(s) 1708, the CPU(s) 1706, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing system 1700 of FIG. 17A—e.g., each device may include similar components, features, and/or functionality of the computing system 1700.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing system 1700 described herein with respect to FIG. 17A. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Figure 17B:
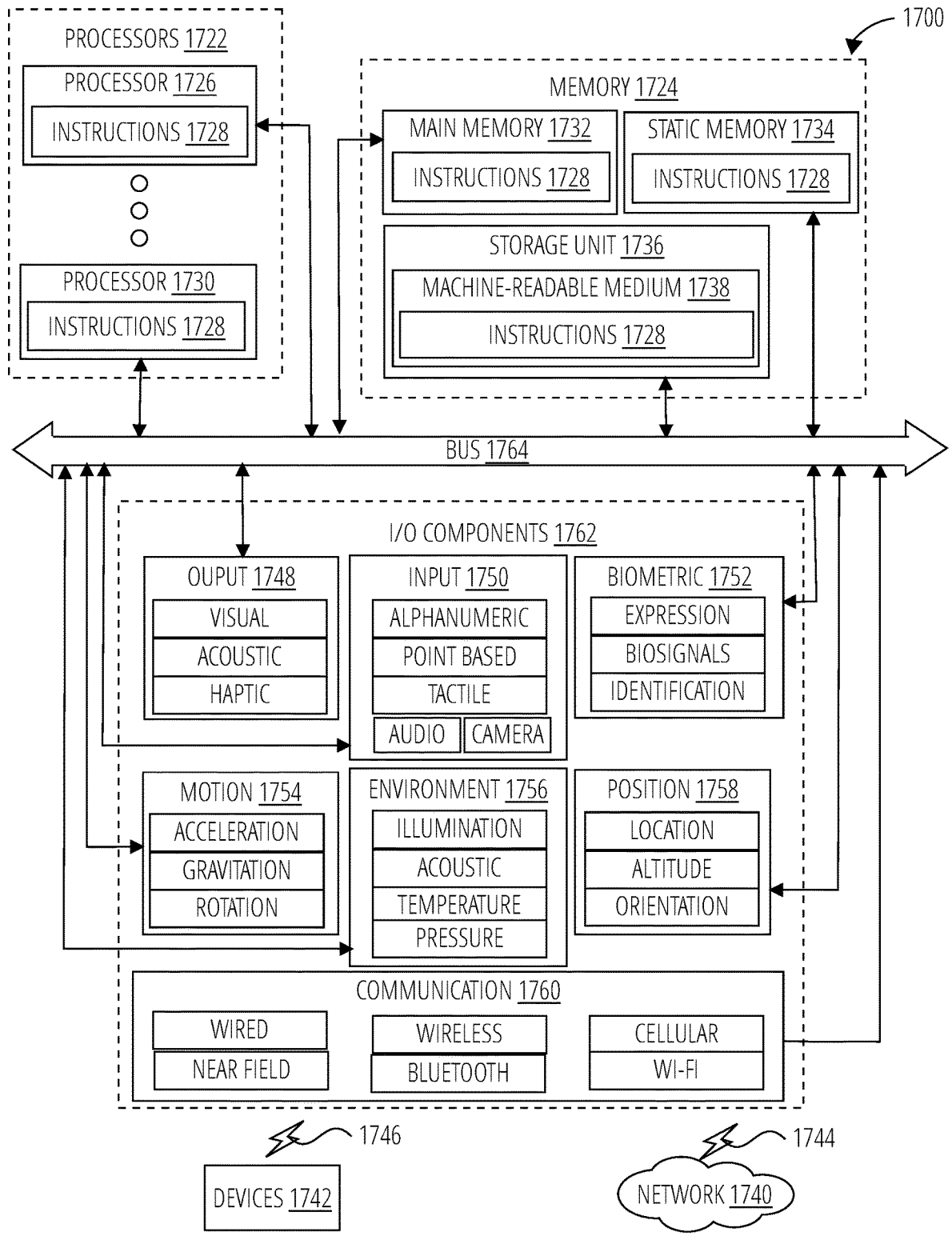
FIG. 17B depicts additional aspects of the computing system 1700 in an example embodiment.

FIG. 17B depicts additional aspects of the computing system 1700 in an example embodiment.

Specifically, FIG. 17B depicts a computing system 1700 comprising instructions 1728 (e.g., a program, an application, an applet, an app, or other executable code) for causing the computing system 1700 to perform any one or more of the operations discussed herein. For example the instructions 1728 may cause the computing system 1700 to carry out aspects of the routine 300, routine 400, routine 500, routine 600, or routine 700. The instructions 1728 configure a general, non-programmed machine into a particular computing system 1700 programmed to carry out said operations.

In alternative embodiments, the computing system 1700 operates as a standalone device or may be coupled (e.g., networked) to other machines. In a networked deployment, the computing system 1700 may operate in the capacity of a server machine or a client machine in a server-client network environment, or as a peer machine in a peer-to-peer (or distributed) network environment. The computing system 1700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1728, sequentially or otherwise, that specify actions to be taken by the computing system 1700. Further, while only a single computing system 1700 is depicted, the term "machine" shall also be taken to include a collection of machines that individually or jointly execute the instructions 1728 to perform any one or more of the methodologies or subsets thereof discussed herein.

The computing system 1700 may include processors 1722, memory 1724, and I/O components 1762, which may be configured to communicate with each other such as via one or more bus 1764. In an example embodiment, the processors 1722 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1726 and processor 1730) to execute the instructions 1728. The term "processor" is intended to include multi-core processors that may comprise two or more independent processors (sometimes referred to as "cores") that may execute instructions contemporaneously. Although FIG. 17B depicts multiple processors 1722, the computing system 1700 may include a single processor with a single core, a single processor with multiple cores (e.g., a multi-core processor), multiple processors with a single core, multiple processors with multiples cores, or any combination thereof.

The memory 1724 may include one or more of a main memory 1732, a static memory 1734, and a storage unit 1736, each accessible to the processors 1722 such as via the bus 1764. The main memory 1732, the static memory 1734, and storage unit 1736 may be utilized, individually or in combination, to store the instructions 1728 embodying any one or more of the functionality described herein. The instructions 1728 may reside, completely or partially, within the main memory 1732, within the static memory 1734, within a machine-readable medium 1738 within the storage unit 1736, within at least one of the processors 1722 (e.g., within the processor's cache memory), or any suitable combination thereof, during execution thereof by the computing system 1700.

The I/O components 1762 may include a wide variety of components to receive input, provide output, produce output, transmit information, exchange information, capture measurements, and so on. The specific I/O components 1762 that are included in a particular machine will depend on the type of machine. For example, portable machines such as mobile phones will likely include a touch input device or other such input mechanisms, while a headless server machine will likely not include such a touch input device. It will be appreciated that the I/O components 1762 may include many other components that are not shown in FIG. 17B. The I/O components 1762 are grouped according to functionality merely for simplifying the following discussion and the grouping is in no way limiting. In various example embodiments, the I/O components 1762 may include output components 1748 and input components 1750. The output components 1748 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1750 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1762 may include biometric components 1752, motion components 1754, environmental components 1756, or position components 1758, among a wide array of possibilities. For example, the biometric components 1752 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1754 may include acceleration sensor components (e.g., accelerometer), gravitation sensor components, rotation sensor components (e.g., gyroscope), and so forth. The environmental components 1756 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1758 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1762 may include communication components 1760 operable to couple the computing system 1700 to a network 1740 or devices 1742 via a coupling 1744 and a coupling 1746, respectively. For example, the communication components 1760 may include a network interface component or another suitable device to interface with the network 1740. In further examples, the communication components 1760 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1742 may be another machine or any of a wide variety of peripheral devices (e.g., a peripheral device coupled via a USB).

Moreover, the communication components 1760 may detect identifiers or include components operable to detect identifiers. For example, the communication components 1760 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1760, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 1724, main memory 1732, static memory 1734, and/or memory of the processors 1722) and/or storage unit 1736 may store one or more sets of instructions and data structures (e.g., software) embodying or utilized by any one or more of the methodologies or functions described herein. These instructions (e.g., the instructions 1728), when executed by processors 1722, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

In various example embodiments, one or more portions of the network 1740 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1740 or a portion of the network 1740 may include a wireless or cellular network, and the coupling 1744 may be a Code Division Multiple Access (CDMA) connection, a Global System for Mobile communications (GSM) connection, or another type of cellular or wireless coupling. In this example, the coupling 1744 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), World-wide Interoperability for Microwave Access (WiMAX), Long Term Evolution (LTE) standard, others defined by various standard-setting organizations, other long range protocols, or other data transfer technology.

The instructions 1728 and/or data generated by or received and processed by the instructions 1728 may be transmitted or received over the network 1740 using a transmission medium via a network interface device (e.g., a network interface component included in the communication components 1760) and utilizing any one of a number of well-known transfer protocols (e.g., hypertext transfer protocol (HTTP)). Similarly, the instructions 1728 may be transmitted or received using a transmission medium via the coupling 1746 (e.g., a peer-to-peer coupling) to the devices 1742. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1728 for execution by the computing system 1700, and/or data generated by execution of the instructions 1728, and/or data to be operated on during execution of the instructions 1728, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Code Listing Examples

Without Foveation
Inputs
   3D model of the scene
   eye position relative to the scene
   type of primitives to be used (eg, points, polygons, etc.)
   function, EField, which calculates the electric field of the primitives at arbitrary displacement from each primitive
   Maximum and minimum positions
   Minimum distance to a wavefront recording plane $z\_min$
   Standard math functions Abs( ) and Arg( ) which return the magnitude and argument of a complex number; that is, given a complex number $$z=re^{i\theta}$$

where Abs(z)=r and Arg(z)=θ.
Step 1: Generate Primitives {p}:
   Place camera at position of user's eye relative to the scene
   Convert 3D model into a polygonal mesh.
   Allocate space for storage of
      primitives
      color of primitives
      depth of primitives
      maximum distance from camera
      minimum distance from camera.
   If using_points, store the vertices of the mesh which are visible to the camera as the primitives, {p}
   else store the polygons from the mesh which are visible to the camera as the primitives, {p}
   for each primitive in {p}:
      store depth of primitive
      store color of primitive
   sort primitives based on depth
   store the maximum and minimum depths of the primitives {p} relative to the camera (maximum_depth, minimum_depth)
Step 2: Apply Wavefront Recording Planes
   z_max=min(maximum_complexity_distance, distance_at_which_additions_to_Efield_become_negligable)
   Allocate storage for wavefront recording planes
   next_plane_position=minimum_depth−z_min
   While (next_plane_position+z_min)<maximum_depth:
      place a wavefront recording plane at next_plane_position
      Associate the primatives with depths between next_plane_position+z_min and next_plane_position+z_max with this wavefront recording plane
      next_plane_position=next_plane_position+z_max
Step 3: Calculate Wavefront at Each Wavefront Recording Plane
   for each wavefront_recording_plane in wavefront_recording_planes:
      assign threads to each primitive
      for each p in primitives associated with wavefront:
      populate a list of pixels in the wavefront_recording_plane associated with p
      hash the array of pixel IDs and associated pixels to create a list of primitives associated with each pixel in wavefront_recording_plane
      assign threads to each pixel in wavefront_recording_plane, calculate the electric field for that pixel, E_pixel:
      E_pixel=0
      For each primitive associated with this pixel:
         E_pixel+=Efield(primitive)
Step 4: Propagate Wavefront from Wavefront Recording Planes to Hologram Plane and Sum to Make Hologram (This Uses the Angular Spectrum Method; but Other Methods are Possible as Known in the Art)
   hologram_sum=zeros(hologram_dimensions)
   for each wavefront_recording_plane:
      compute 2D array, S-$_p$, which adjusts the phase of each Fourier component for the Angular Spectrum Method appropriately
   for each wavefront_recording_plane:
      $E_f$=2DFFT(wavefront_recording_plane)
      E_phase_adjusted=site_by_site_multiply(Er,Sp)
      Eh=2D_FFT_Inverse(E_phase_adjusted)
      Hologram_sum+=Eh
Step 5: Display Fully Complex Hologram or Compute Amplitude or Phase Hologram and Display that.
   Phase_hologram=Arg(Hologram_sum)
   Amplitude_hologram=Abs(Hologram_sum)
With Foveation:
Step 1: Generate Primitives {p}:
   (same as step 1 from pseudocode without foveation)
Step 2: Apply Wavefront Recording Planes
   z_max=min(maximum_complexity_distance, distance_at_which_additions_to_Efield_become_negligible)
   Allocate storage for wavefront recording planes
   next_plane_position=minimum_depth−z_min
   While (next_plane_position+z_min)<maximum_depth:
      place a peripheral_wavefront_recording_plane at next_plane_position.

Place a foveal_wavefront_recording_plane at next_plane_position
Associate the primatives with depths between next_plane_position+z_min and next_plane_position+z_max with the wavefront_recording_planes at next_plane_position
next_plane_position=next_plane_position+z_max
Step 3: Calculate Wavefront at Each Wavefront Recording Plane
for each wavefront_recording_plane in wavefront_recording_planes:
assign threads to each primitive
for each p in primitives associated with wavefront:
create a list of pixels in the wavefront_recording_plane associated with p to which p contributes to the electric field in those pixels
hash the array of pixel IDs and associated pixels to create a list of primitives associated with each pixel in wavefront_recording_plane
assign threads to each pixel in wavefront_recording_plane, calculate the electric field for that pixel, E_pixel:
E_pixel=0
For each primitive associated with this pixel:
E_pixel+=Efield(primitive)
Step 4: Combine Foveal and Peripheral Wavefront Recording Planes in the Same Location to Create a Foveated Wavefront Recording Plane at that Position
For each location which contains wavefront recording planes:
Supersample the peripheral wavefront recording plane at that location so that it has the same spatial resolution as the foveal recording plane
Replace the pixels at the location of the foveal wavefront recording plane in the supersampled peripheral wavefront recording plane with the pixels from the foveal wavefront recording plane. This is the foveated wavefront recording plane for that location.
Step 5: Propagate Wavefront from Foveated Wavefront Recording Planes to Hologram Plane and Sum to Make Hologram (This Uses the Angular Spectrum Method; but, Other Methods are Possible as Known in the Art)
(same as step 4 from pseudocode without foveation)
Step 6: Display Fully Complex Hologram or Compute Amplitude or Phase Hologram and Display That.
(same as step 5 from pseudocode without foveation)

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A non-transitory computer-readable storage medium, the computer-readable storage medium including instructions that when executed by a computer, cause the computer to:
   generate a plurality of wave front recording planes;
   apply spatial hashing to a summation of at least one field contribution propagated from points of a display object to each of the wave front recording planes; and
   separately propagate a foveal component and a peripheral component of the wave front recording planes to a foveated hologram.

2. The computer-readable storage medium of claim 1, wherein the display object is a polygonal object.

3. The computer-readable storage medium of claim 1, wherein the display object is a point cloud.

4. The computer-readable storage medium of claim 3, wherein the instructions further configure the computer to:
   in a first pass, apply a first graphics processing unit kernel to iterate through the points in the point cloud and determining a set of key value pairs for pixels of the wave front recording planes.

5. The computer-readable storage medium of claim 4, wherein the array is hashed into a hash table.

6. The computer-readable storage medium of claim 4, wherein the instructions further configure the computer to:
   in a second pass, apply a second graphics processing unit kernel to iterate through the pixels to generate contributions from the field.

7. A computing apparatus, the computing apparatus comprising:
   a processor; and
   a memory storing instructions that, when executed by the processor, configure the apparatus to:
      apply a wave front recording plane to one or more objects in a scene to be rendered on a holographic display; and
      apply spatial hashing to transform the objects into key value pairs where a key defines an individual position on the wave front recording plane and a value represents a point or polygon of the objects that contributes to a field at the individual key position in the wave front recording plane.

8. The computing apparatus of claim 7 wherein the instructions further configure the apparatus to:
   foveate the wave front recording plane.

9. The computing apparatus of claim 8, wherein the instructions further configure the apparatus to:
   determine a foveal component and a peripheral component of the wave front recording plane;
   transform the foveal component and the peripheral component into a frequency domain to generate a transformed foveal component and a transformed peripheral component;
   combine the transformed foveal component and the transformed peripheral component to generate a combined transformation; and
   adjust phases of the combined transformation.

10. The computing apparatus of claim 8, wherein the instructions further configure the apparatus to:
    generate a foveal component and a peripheral component of the wave front recording plane;
    transform the foveal component and the peripheral component into a frequency domain to generate a transformed foveal component and a transformed peripheral component;
    adjust phases of the transformed foveal component and the transformed peripheral component; and
    combine the transformed foveal component and the transformed peripheral component in the frequency domain.

11. The computing apparatus of claim 8, wherein the instructions further configure the apparatus to:
    sample a foveal component and a peripheral component of the wave front recording plane;
    propagate the foveal component and the peripheral component separately to a first component hologram and a second component hologram; and
    combine the component holograms into a foveated hologram.

12. The computing apparatus of claim 8, wherein the instructions further configure the apparatus to:
    generate a foveal component and a peripheral component of the wave front recording plane;
    combine the foveal component and the peripheral component at a position of the wave front recording plane to generate a foveated wave front recording plane; and
    propagate the foveated wave front recording plane to a position of a hologram.

13. A method comprising:
    applying a wave front recording plane to calculate an electric field proximate to an object representation in a scene to be rendered on a holographic display; and
    applying spatial hashing to structure the object representation into key value pairs where a key defines an individual key position on the wave front recording plane and a value represents a point or polygon of the object representation that contributes to light at the individual key position in the wave front recording plane.

14. The method of claim 13 further comprising:
    applying foveation to the wave front recording plane.

15. The method of claim 14, further comprising:
    sampling a foveal component and a peripheral component of the wave front recording plane separately;
    transforming the foveal component and the peripheral component into a frequency domain to generate a transformed foveal component and a transformed peripheral component;
    combining the transformed foveal component and the transformed peripheral component in the frequency domain to generate a combined transformation; and
    adjusting phases of the combined transformation using angular spectrum techniques.

16. The method of claim 14, further comprising:
    sampling a foveal component and a peripheral component of the wave front recording plane separately;
    transforming the foveal component and the peripheral component into a frequency domain to generate a transformed foveal component and a transformed peripheral component;
    adjusting phases of the transformed foveal component and the transformed peripheral component using angular spectrum techniques; and combining the transformed foveal component and the transformed peripheral component in the frequency domain to generate a combined transformation.

17. The method of claim 14, further comprising:
sampling a foveal component and a peripheral component of the wave front recording plane separately;
propagating the foveal component and the peripheral component separately to a first component hologram and a second component hologram; and
combining the component holograms into a foveated hologram.

18. The method of claim 14, further comprising:
sampling a foveal component and a peripheral component of the wave front recording plane separately;
combining the foveal component and the peripheral component at a position of the wave front recording plane to generate a foveated wave front recording plane; and
propagating the foveated wave front recording plane to a position of a hologram.

19. A method comprising:
generating a plurality of wave front recording planes; and
applying spatial hashing to a summation of at least one field from points or polygons of a display object to each of the wave front recording planes.

20. The method of claim 19, further comprising:
in a first pass, applying a first graphics processing unit kernel to iterate through the points or polygons and determining a set of pixels of the wave front recording planes that correspond to each of the points or polygons to generate an array of key value pairs.

21. The method of claim 20, wherein the array is hashed into a Cuckoo hash table.

22. The method of claim 20, further comprising:
in a second pass, applying a second graphics processing unit kernel to iterate through the set of pixels to identify a set of contribution points from the field.

23. A method comprising:
on a server system:
applying a wave front recording plane to calculate an electric field proximate to an object representation in a scene to be rendered on a holographic display;
sampling a foveal component and a peripheral component of the wave front recording plane separately;
transforming the foveal component and the peripheral component into a frequency domain to generate a transformed foveal component and a transformed peripheral component;
combining the transformed foveal component and the transformed peripheral component in the frequency domain to generate a combined transformation;
adjusting phases of the combined transformation using angular spectrum techniques to generate a hologram; and
communicating the hologram to a client device;
on the client device:
receiving the hologram; and
rendering the hologram as the object representation on the holographic display.

24. The method of claim 23 further comprising:
on the server system, applying spatial hashing to structure the object representation into key value pairs where a key defines an individual key position on the wave front recording plane and a value represents a point or polygon of the object representation that contributes to light at the individual key position in the wave front recording plane.

25. The method of claim 24, further comprising, on the server system:
propagating the foveal component and the peripheral component separately to a first component hologram and a second component hologram; and
combining the component holograms into a foveated hologram.

26. The method of claim 24, further comprising, on the server system:
combining the foveal component and the peripheral component at a position of the wave front recording plane to generate a foveated wave front recording plane; and
propagating the foveated wave front recording plane to a position of the hologram.

* * * * *